(12) United States Patent
Mizuno et al.

(10) Patent No.: US 7,787,220 B2
(45) Date of Patent: Aug. 31, 2010

(54) MAGNETORESISTANCE ELEMENT WITH IMPROVED MAGENTORESISTANCE CHANGE AMOUNT AND WITH FREE LAYER HAVING IMPROVED SOFT MAGNETIC CHARACTERISTICS

(75) Inventors: Tomohito Mizuno, Tokyo (JP); Daisuke Miyauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 1104 days.

(21) Appl. No.: 11/391,278

(22) Filed: Mar. 29, 2006

(65) Prior Publication Data
US 2006/0240289 A1 Oct. 26, 2006

(30) Foreign Application Priority Data
Apr. 4, 2005 (JP) .............. 2005-106999

(51) Int. Cl.
*G11B 5/33* (2006.01)
(52) U.S. Cl. ................ 360/324.12
(58) Field of Classification Search ........... 360/324.12
See application file for complete search history.

(56) References Cited

U.S. PATENT DOCUMENTS

| | | | |
|---|---|---|---|
| 6,275,033 B1 * | 8/2001 | Kools | 324/252 |
| 6,829,121 B2 | 12/2004 | Ikeda et al. | |
| 7,218,483 B2 | 5/2007 | Yuasa et al. | |
| 2002/0051380 A1 | 5/2002 | Kamiguchi et al. | |
| 2003/0011944 A1 | 1/2003 | Hosomi | |
| 2003/0179071 A1 | 9/2003 | Hiramoto et al. | |
| 2005/0052788 A1 | 3/2005 | Kamiguchi et al. | |
| 2005/0201021 A1 | 9/2005 | Hosomi | |

FOREIGN PATENT DOCUMENTS

| | | |
|---|---|---|
| JP | A 2002-092826 | 3/2002 |
| JP | A 2002-359412 | 12/2002 |
| JP | A-2003-008102 | 1/2003 |
| JP | A-2003-060261 | 2/2003 |
| JP | A-2003-318462 | 11/2003 |
| JP | 2004-006589 | 1/2004 |
| JP | A-2004-179668 | 6/2004 |

* cited by examiner

*Primary Examiner*—David D Davis
(74) *Attorney, Agent, or Firm*—Oliff & Berridge, PLC

(57) ABSTRACT

A free layer of an MR element incorporates a first layer, a second layer, a third layer, a fourth layer, a fifth layer and a sixth layer that are stacked in this order on a nonmagnetic conductive layer. The absolute value of magnetostriction constant of the free layer is $1 \times 10^{-6}$ or smaller. The coercivity of the free layer is $20 \times 79.6$ A/m or smaller. The first layer is made of an alloy containing 'a' atomic percent cobalt and (100−a) atomic percent iron wherein 'a' falls within a range of 20 to 50 inclusive. The second layer is made of an alloy containing 'b' atomic percent cobalt and (100−b) atomic percent iron wherein 'b' falls within a range of 70 to 90 inclusive. In addition, oxidation treatment is given to a surface of the second layer farther from the first layer.

14 Claims, 8 Drawing Sheets

MAGNETORESISTANCE ELEMENT WITH IMPROVED MAGENTORESISTANCE CHANGE AMOUNT AND WITH FREE LAYER HAVING IMPROVED SOFT MAGNETIC CHARACTERISTICS

BACKGROUND OF THE INVENTION

1. Field of the Invention

The present invention relates to a magnetoresistive element and a method of manufacturing the same and to a magnetoresistive device, a thin-film magnetic head, a head gimbal assembly, a head arm assembly and a magnetic disk drive each of which incorporates the magnetoresistive element.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write (recording) head having an induction-type electromagnetic transducer for writing and a read (reproducing) head having a magnetoresistive (MR) element for reading are stacked on a substrate.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect.

It is required that the characteristics of a read head include high sensitivity and high output capability. GMR heads incorporating spin-valve GMR elements have been mass-produced as read heads that satisfy such requirements. Recently, developments in read heads using TMR elements have been sought to conform to further improvements in areal recording density.

Typically, a spin-valve GMR element incorporates: a nonmagnetic conductive layer having two surfaces facing toward opposite directions; a free layer disposed adjacent to one of the surfaces of the nonmagnetic conductive layer; a pinned layer disposed adjacent to the other of the surfaces of the nonmagnetic conductive layer; and an antiferromagnetic layer disposed adjacent to one of the surfaces of the pinned layer farther from the nonmagnetic conductive layer. The free layer is a layer in which the direction of magnetization changes in response to a signal magnetic field. The pinned layer is a ferromagnetic layer in which the direction of magnetization is fixed. The antiferromagnetic layer is a layer that fixes the direction of magnetization in the pinned layer by means of exchange coupling with the pinned layer.

Conventional GMR heads have a structure in which a current used for detecting magnetic signals (that is hereinafter called a sense current) is fed in the direction parallel to a plane of each layer making up the GMR element. Such a structure is called a current-in-plane (CIP) structure. On the other hand, developments have been made for another type of GMR heads each having a structure in which a sense current is fed in the direction intersecting a plane of each layer making up the GMR element, such as the direction perpendicular to a plane of each layer making up the GMR element. Such a structure is called a current-perpendicular-to-plane (CPP) structure. A GMR element used for read heads having the CPP structure is hereinafter called a CPP-GMR element. A GMR element used for read heads having the CIP structure is hereinafter called a CIP-GMR element. A read head incorporating the above-mentioned TMR element has the CPP structure, too.

Compared with a TMR element, a typical CPP-GMR element has a very low electrical resistance since all the layers making up the CPP-GMR element are made of metal materials. Therefore, the typical CPP-GMR element has a problem that the magnetoresistance change amount is small, wherein the magnetoresistance change amount is the product of the electrical resistance and the magnetoresistance change ratio (MR ratio). Furthermore, in a read head using such a CPP-GMR element, the output voltage proportional to the magnetoresistance change amount is low, which is a practical problem of the CPP-GMR element. To solve this problem, a variety of proposals have been made for providing a multilayer pinned layer and/or a multilayer free layer.

For example, Japanese Published Patent Application 2002-92826 discloses a technique wherein at least one of the pinned layer and the free layer of a CPP-GMR element is formed as a layered structure made up of ferromagnetic layers and nonmagnetic layers alternately stacked. This technique provides a great number of interfaces between the ferromagnetic layers and the nonmagnetic layers, and the effect of scattering of electrons depending on spins at the interfaces increases the magnetoresistance change amount.

Japanese Published Patent Application 2004-6589 discloses a technique wherein a very thin layer containing oxide, nitride, oxinitride, phosphide or fluoride is inserted inside a ferromagnetric layer (the pinned layer and the free layer) of a CPP-GMR element or inserted to the interface between the ferromagnetic layer and a nonmagnetic conductive layer of the CPP-GMR element. The thin layer modulates the band structure of the ferromagnetic layer near the thin layer, and causes the spin filter action of electrons. The objective of this technique is to achieve a CPP-GMR element having a great magnetoresistance change ratio without increasing the element resistance.

Japanese Published Patent Application 2002-359412 discloses a technique wherein a high resistance layer is provided across the passage of a sense current in a CPP-GMR element. The objective of this technique is to increase the magnetoresistance change amount by increasing the element resistance.

It is possible to increase the electrical resistance or the magnetoresistance change ratio of the CPP-GMR element by providing a multilayer pinned layer and/or a multilayer free layer. However, the magnetoresistance change amount of conventional CPP-GMR elements obtained so far is not large enough.

Furthermore, it is also required that the CPP-GMR element have a high magnetic field sensitivity (the magnetoresistance change/the external field change). For achieving a high magnetic field sensitivity of the CPP-GMR element, it is required that the free layer have excellent soft magnetic characteristics. To be specific, excellent soft magnetic characteristics mean that the magnetostriction constant and the coercivity are small.

OBJECT AND SUMMARY OF THE INVENTION

It is an object of the invention to provide a magnetoresistive element in which a current is fed in the direction intersecting each layer making up the magnetoresistive element, wherein the element has a great magnetoresistance change amount, and a free layer has an excellent soft magnetic property, and to provide a method of manufacturing such a magnetoresistive element, and to provide a magnetoresistive device, a thin-film magnetic head, a head gimbal assembly, a head arm assembly and a magnetic disk drive each of which incorporates the magnetoresistive element.

A magnetoresistive element of the invention comprises: a nonmagnetic conductive layer having two surfaces facing toward opposite directions; a free layer disposed adjacent to one of the surfaces of the nonmagnetic conductive layer, the direction of magnetization in the free layer changing in response to an external magnetic field; and a pinned layer disposed adjacent to the other of the surfaces of the nonmagnetic conductive layer, the direction of magnetization in the pinned layer being fixed. A current for detecting magnetic signals is fed in a direction intersecting each of the layers. In the magnetoresistive element of the invention, the free layer incorporates a plurality of layers including a first layer placed at a location to touch one of the surfaces of the nonmagnetic conductive layer. The first layer is made of an alloy containing 'a' atomic percent cobalt and (100−a) atomic percent iron wherein 'a' falls within a range of 20 to 50 inclusive. The free layer has a magnetostriction constant whose absolute value is $1\times10^{-6}$ or smaller. The free layer has a coercivity of 20×79.6 A/m or smaller.

In the magnetoresistive element of the invention, the free layer has the first layer made of an alloy containing 'a' atomic percent cobalt and (100−a) atomic percent iron wherein 'a' falls within a range of 20 to 50 inclusive. As a result, it is possible to increase the magnetoresistance change amount of the magnetoresistive element and to make the free layer have excellent soft magnetic characteristics so that the absolute value of magnetostriction constant of the free layer is $1\times10^{-6}$ or smaller, and that the coercivity of the free layer is 20×79.6 A/m or smaller.

In the magnetoresistive element of the invention, the free layer may incorporate a second layer disposed on a side of the first layer farther from the nonmagnetic conductive layer, and the second layer may be made of an alloy containing 'b' atomic percent cobalt and (100−b) atomic percent iron wherein 'b' falls within a range of 70 to 90 inclusive. In addition, oxidation treatment may be given to a surface of the second layer farther from the first layer.

In the magnetoresistive element of the invention, the free layer may incorporate a third layer disposed on a side of the second layer farther from the first layer, and the third layer may be made of an alloy containing nickel and iron. The third layer may be made of an alloy containing 'c' atomic percent nickel and (100−c) atomic percent iron wherein 'c' falls within a range of 82 to 85 inclusive. Alternatively, the third layer may be made of an alloy containing 'c' atomic percent nickel and (100−c) atomic percent iron wherein 'c' is 82 or 85.

In the magnetoresistive element of the invention, the free layer may incorporate a fourth layer, a fifth layer and a sixth layer that are disposed in this order on a side of the third layer farther from the second layer. In addition, the fourth layer may be made of an alloy containing 'd' atomic percent cobalt and (100−d) atomic percent iron wherein 'd' falls within a range of 70 to 90 inclusive, the fifth layer may be made of an alloy containing nickel and iron, and the sixth layer may be made of an alloy containing 'f' atomic percent cobalt and (100−f) atomic percent iron wherein 'f' falls within a range of 70 to 90 inclusive. The fifth layer may be made of an alloy containing 'e' atomic percent nickel and (100−e) atomic percent iron wherein 'e' falls within a range of 82 to 85 inclusive. Alternatively, the fifth layer may be made of an alloy containing 'e' atomic percent nickel and (100−e) atomic percent iron wherein 'e' is 82 or 85.

A magnetoresistive element manufactured through a method of the invention comprises: a nonmagnetic conductive layer having two surfaces facing toward opposite directions; a free layer disposed adjacent to one of the surfaces of the nonmagnetic conductive layer, the direction of magnetization in the free layer changing in response to an external magnetic field; and a pinned layer disposed adjacent to the other of the surfaces of the nonmagnetic conductive layer, the direction of magnetization in the pinned layer being fixed. A current for detecting magnetic signals is fed in a direction intersecting each of the layers.

The method of manufacturing the magnetoresistive element of the invention comprises the steps of forming the pinned layer, the nonmagnetic conductive layer and the free layer, respectively. A plurality of layers including a first layer placed at a location to touch one of the surfaces of the nonmagnetic conductive layer are formed in the step of forming the free layer. The first layer is made of an alloy containing 'a' atomic percent cobalt and (100−a) atomic percent iron wherein 'a' falls within a range of 20 to 50 inclusive. The free layer is made to have a magnetostriction constant whose absolute value is $1\times10^{-6}$ or smaller. The free layer is made to have a coercivity of 20×79.6 A/m or smaller.

A magnetoresistive device of the invention comprises the magnetoresistive element of the invention and a pair of electrodes for feeding a current for detecting magnetic signals to the magnetoresistive element in a direction intersecting each layer making up the magnetoresistive element.

A thin-film magnetic head of the invention comprises: a medium facing surface that faces toward a recording medium; the magnetoresistive element of the invention disposed near the medium facing surface to detect a signal magnetic field sent from the recording medium; and a pair of electrodes for feeding a current for detecting magnetic signals to the magnetoresistive element in a direction intersecting each layer making up the magnetoresistive element.

A head gimbal assembly of the invention comprises: a slider including the thin-film magnetic head of the invention and disposed to face toward a recording medium; and a suspension flexibly supporting the slider. A head arm assembly of the invention comprises: a slider including the thin-film magnetic head of the invention and disposed to face toward a recording medium; a suspension flexibly supporting the slider; and an arm for making the slider travel across tracks of the recording medium, the suspension being attached to the arm.

A magnetic disk drive of the invention comprises: a slider including the thin-film magnetic head of the invention and disposed to face toward a circular-plate-shaped recording medium that is driven to rotate; and an alignment device supporting the slider and aligning the slider with respect to the recording medium.

In the invention, the free layer of the magnetoresistive element incorporates the first layer made of an alloy containing 'a' atomic percent cobalt and (100−a) atomic percent iron wherein 'a' falls within a range of 20 to 50 inclusive. In addition, the absolute value of magnetostriction constant of the free layer is $1\times10^{-6}$ or smaller, and the coercivity of the free layer is 20×79.6 A/m or smaller. As a result, according to the invention, it is possible to increase the magnetoresistance change amount of the magnetoresistive element and to make the free layer have excellent soft magnetic characteristics.

Other and further objects, features and advantages of the invention will appear more fully from the following description.

DETAILED DESCRIPTION OF THE PREFERRED EMBODIMENT

Figure 2:
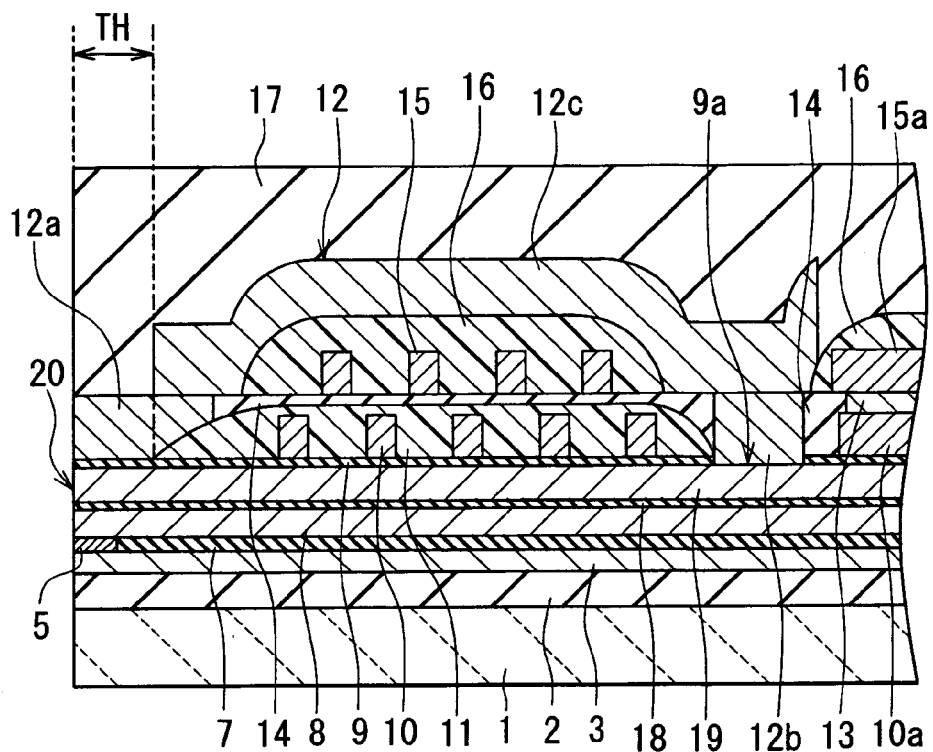
FIG. 2 is a cross-sectional view of a thin-film magnetic head of the embodiment of the invention, wherein the cross section is orthogonal to the air bearing surface and the substrate.
Figure 3:
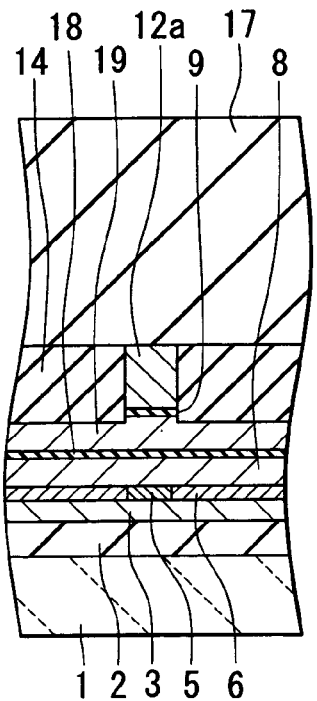
FIG. 3 is a cross-sectional view of the pole portion of the thin-film magnetic head of the embodiment of the invention, wherein the cross section is parallel to the air bearing surface.

A preferred embodiment of the invention will now be described in detail with reference to the accompanying drawings. Reference is now made to FIG. 2 and FIG. 3 to describe the outlines of the configuration and a manufacturing method of a thin-film magnetic head of the embodiment of the invention. FIG. 2 illustrates a cross section of the thin-film magnetic head orthogonal to an air bearing surface and a substrate. FIG. 3 illustrates a cross section of a pole portion of the thin-film magnetic head parallel to the air bearing surface.

In the method of manufacturing the thin-film magnetic head of the embodiment, first, an insulating layer 2 made of an insulating material such as alumina ($Al_2O_3$) and having a thickness of 1 to 5 μm, for example, is formed by a method such as sputtering on a substrate 1 made of a ceramic such as aluminum oxide and titanium carbide ($Al_2O_3$—TiC). Next, a first shield layer 3 for a read head having a specific pattern and made of a magnetic material such as NiFe or FeAlSi is formed on the insulating layer 2 by a method such as plating. Next, although not shown, an insulating layer of alumina, for example, is formed over the entire surface. Next, the insulating layer is polished by chemical mechanical polishing (CMP), for example, so that the first shield layer 3 is exposed, and the top surfaces of the first shield layer 3 and the insulating layer are thereby flattened.

Next, an MR element 5 for reading is formed on the first shield layer 3. Next, although not shown, an insulating film is formed to cover the two sides of the MR element 5 and the top surface of the first shield layer 3. The insulating film is made of an insulating material such as alumina. Next, two bias field applying layers 6 are formed to be located adjacent to the two sides of the MR element 5 with the insulating film disposed in between. Next, an insulating layer 7 is formed to be disposed around the MR element 5 and the bias field applying layers 6. The insulating layer 7 is made of an insulating material such as alumina.

Next, a second shield layer 8 for the read head is formed on the MR element 5, the bias field applying layers 6 and the insulating layer 7. The second shield layer 8 is made of a magnetic material and may be formed by plating or sputtering, for example. Next, a separating layer 18 made of a nonmagnetic material such as alumina is formed by sputtering, for example, on the second shield layer 8. Next, a bottom pole layer 19 provided for a write head and made of a magnetic material is formed on the separating layer 18 by plating or sputtering, for example. The magnetic material used for the second shield layer 8 and the bottom pole layer 19 is a soft magnetic material such as NiFe, CoFe, CoFeNi or FeN. Alternatively, a second shield layer that also functions as a bottom pole layer may be provided in place of the second shield layer 8, the separating layer 18 and the bottom pole layer 19.

Next, a write gap layer 9 made of a nonmagnetic material such as alumina and having a thickness of 50 to 300 nm, for example, is formed on the bottom pole layer 19 by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 μm, for example, is formed on the write gap layer 9. In FIG. 2, numeral 10a indicates a connecting portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat treatment is performed at a specific temperature to flatten the surface of the insulating layer 11. Through this heat treatment, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to an air bearing surface 20 described later toward the air bearing surface 20. The top pole layer 12 is made up of the track width defining layer 12a, and a coupling portion layer 12b and a yoke portion layer 12c that will be described later.

The track width defining layer 12a has: a tip portion that is formed on the write gap layer 9 and functions as the pole portion of the top pole layer 12; and a connecting portion that is formed on the sloped portion of the insulating layer 11 closer to the air bearing surface 20 and is connected to the yoke portion layer 12c. The tip portion has a width equal to the write track width. The connecting portion has a width greater than that of the tip portion.

When the track width defining layer 12a is formed, the coupling portion layer 12b made of a magnetic material is formed in the contact hole 9a, and a connecting layer 13 made of a magnetic material is formed on the connecting portion 10a at the same time. The coupling portion layer 12b makes up a portion of the top pole layer 12 that is magnetically coupled to the bottom pole layer 19.

Next, pole trimming is performed. That is, in a region around the track width defining layer 12a, the write gap layer 9 and at least a portion of the pole portion of the bottom pole layer 19 close to the write gap layer 9 are etched, using the track width defining layer 12a as a mask. As a result, as shown in FIG. 3, a trim structure is formed, wherein the pole portion of the top pole layer 12, the write gap layer 9 and at least a portion of the pole portion of the bottom pole layer 19 have equal widths. The trim structure has an effect of preventing an increase in effective track width resulting from an expansion of magnetic flux near the write gap layer 9.

Next, an insulating layer 14 made of an inorganic insulating material such as alumina and having a thickness of 3 to 4 μm, for example, is formed over the entire surface. The insulating layer 14 is then polished by CMP, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3 μm, for example, is formed on the flattened insulating layer 14. In FIG. 2, numeral 15a indicates a connecting portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat treatment is performed at a specific temperature to flatten the surface of the insulating layer 16. Through this heat treatment, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. An end of the yoke portion layer 12c closer to the air bearing surface 20 is located apart from the air bearing surface 20. The yoke portion layer 12c is connected to the bottom pole layer 19 through the coupling portion layer 12b.

Next, an overcoat layer 17 made of alumina, for example, is formed to cover the entire surface. Finally, machining of the slider including the foregoing layers is performed to form the air bearing surface 20 of the thin-film magnetic head including the write head and the read head. The thin-film magnetic head is thus completed.

The thin-film magnetic head thus manufactured comprises the air bearing surface 20 as the medium facing surface that faces toward a recording medium, the read head and the write head. The configuration of the read head will be described in detail later.

The write head incorporates the bottom pole layer 19 and the top pole layer 12 that are magnetically coupled to each other and include the pole portions that are opposed to each other and placed in regions on a side of the air bearing surface 20. The write head further incorporates: the write gap layer 9 provided between the pole portion of the bottom pole layer 19 and the pole portion of the top pole layer 12; and the thin-film coil including the portions 10 and 15 at least part of which is placed between the bottom pole layer 19 and the top pole layer 12 and insulated from the bottom pole layer 19 and the top pole layer 12. In the thin-film magnetic head, as shown in FIG. 2, throat height TH is the length from the air bearing surface 20 to the end of the insulating layer 11 closer to the air bearing surface 20. The throat height is the length (height) from the air bearing surface 20 to the point at which the distance between the two pole layers starts to increase.

Figure 1:
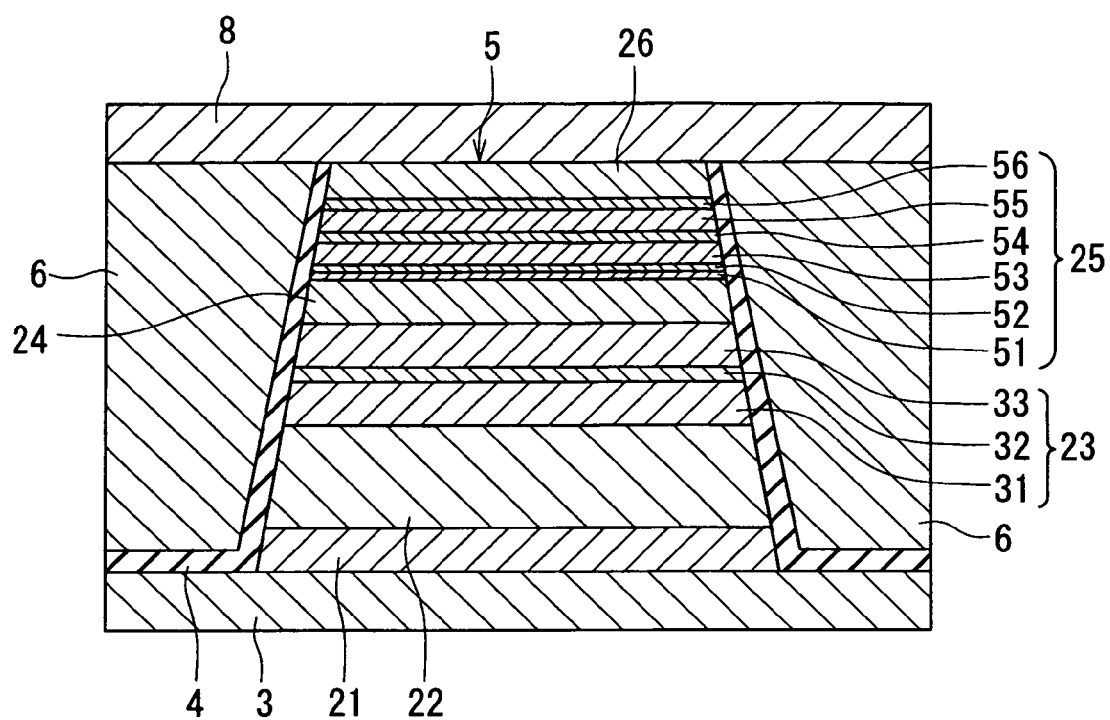
FIG. 1 is a cross-sectional view of a read head of an embodiment of the invention parallel to the air bearing surface.

Reference is now made to FIG. 1 to describe the details of the configuration of the read head. FIG. 1 is a cross-sectional view of the read head parallel to the air bearing surface. The read head corresponds to the magnetoresistive device of the invention.

The read head of the embodiment comprises: the first shield layer 3 and the second shield layer 8 disposed with a space from each other; the MR element 5 disposed between the first shield layer 3 and the second shield layer 8; the insulating film 4 that covers the two sides of the MR element 5 and the top surface of the first shield layer 3; and the two bias field applying layers 6 disposed adjacent to the two sides of the MR element 5 with the insulating film 4 disposed in between. The insulating film 4 is made of alumina, for example. The bias field applying layers 6 are each made of a hard magnetic layer (hard magnet) or a layered structure made up of ferromagnetic layers and antiferromagnetic layers, for example. To be specific, the bias field applying layers 6 are made of CoPt or CoCrPt, for example.

The read head of the embodiment has the CPP structure. The first shield layer 3 and the second shield layer 8 also function as a pair of electrode layers for feeding a sense current to the MR element 5 in a direction intersecting the plane of each layer making up the MR element 5, such as the direction perpendicular to the plane of each layer making up the MR element 5. Alternatively, a pair of electrode layers may be provided on the top and bottom of the MR element 5, besides the first and second shield layers 3 and 8. The MR element 5 is a spin-valve GMR element. The resistance of the MR element 5 changes in response to a signal magnetic field from the recording medium. A sense current is fed in a direction intersecting the plane of each layer making up the MR element 5, such as the direction perpendicular to the plane of each layer making up the MR element 5. It is possible to obtain the resistance of the MR element 5 from the sense current. It is thereby possible to read data stored on the recording medium through the use of the read head.

The MR element 5 comprises an underlying layer 21, an antiferromagnetic layer 22, a pinned layer 23, a nonmagnetic conductive layer 24, a free layer 25 and a protection layer 26 that are stacked one by one on the first shield layer 3. The pinned layer 23 is a layer in which the direction of magnetization is fixed. The antiferromagnetic layer 22 is a layer that fixes the direction of magnetization in the pinned layer 23 by exchange coupling with the pinned layer 23. The underlying layer 21 is provided for improving the crystallinity and orientability of each layer formed thereon and particularly for enhancing the exchange coupling between the antiferromagnetic layer 22 and the pinned layer 23. The free layer 25 is a layer in which the direction of magnetization changes in response to an external magnetic field, that is, a signal magnetic field sent from the recording medium. The protection layer 26 is a layer for protecting the layers therebelow.

The underlying layer 21 has a thickness of 2 to 6 nm, for example. The underlying layer 21 may be made of a layered structure made up of a Ta layer and an NiFeCr layer, for example.

The antiferromagnetic layer 22 has a thickness of 5 to 30 nm, for example, and may be made of an antiferromagnetic material including Mn and at least one element $M_{II}$ among the group consisting of Pt, Ru, Rh, Pd, Ni, Cu, Ir, Cr and Fe. The proportion of Mn preferably falls within a range of 35 to 95 atomic % inclusive. The proportion of the other element $M_{II}$ preferably falls within a range of 5 to 65 atomic % inclusive. One type of antiferromagnetic material is a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 22 may be made of either of these types.

The non-heat-induced antiferromagnetic materials include an Mn alloy that has a γ phase, such as RuRhMn, FeMn, and IrMn. The heat-induced antiferromagnetic materials include an Mn alloy that has a regular crystal structure, such as PtMn, NiMn, and PtRhMn.

The direction of magnetization is fixed in the pinned layer 23 by means of the exchange coupling at the interface between the antiferromagnetic layer 22 and the pinned layer 23. The pinned layer 23 of the embodiment is a so-called synthetic pinned layer that incorporates an outer layer 31, a nonmagnetic middle layer 32 and an inner layer 33 that are stacked in this order on the antiferromagnetic layer 22. Each of the inner layer 33 and the outer layer 31 includes a magnetic layer made of a ferromagnetic material including at least Co selected from the group consisting of Co and Fe. The inner layer 33 and the outer layer 31 are antiferromagnetic-coupled to each other and the directions of magnetization thereof are fixed to opposite directions. The inner layer 33 has a thickness of 3 to 7 nm, for example. The outer layer 31 has a thickness of 3 to 7 nm, for example.

The inner layer 33 may be made up of a single magnetic layer or a plurality of layers including a nonmagnetic layer such as a Cu layer in addition to a magnetic layer. It is possible to increase the magnetoresistance change of the MR element 5 if the inner layer 33 is made up of a plurality of layers including a nonmagnetic layer such as a Cu layer in addition to a magnetic layer.

The nonmagnetic middle layer 32 of the pinned layer 23 has a thickness of 0.35 to 1.0 nm, for example, and may be made of a nonmagnetic material including at least one element among the group consisting of Ru, Rh, Ir, Re, Cr, Zr and Cu. The nonmagnetic middle layer 32 is provided for creating antiferromagnetic exchange coupling between the inner layer 33 and the outer layer 31, and for fixing the magnetizations of these layers to opposite directions. The magnetizations of the inner layer 33 and the outer layer 31 in opposite directions include not only the case in which there is a difference of 180 degrees between these directions of magnetizations, but also the case in which there is a difference of 180±20 degrees between them.

The nonmagnetic conductive layer 24 has a thickness of 1.0 to 4.0 nm, for example, and may be made of a nonmagnetic conductive material that includes 80 weight % or greater of at least one element among the group consisting of Cu, Au and Ag.

The free layer 25 incorporates a first layer 51, a second layer 52, a third layer 53, a fourth layer 54, a fifth layer 55 and a sixth layer 56 that are stacked in this order on the nonmagnetic conductive layer 24. Details of these layers will be described later.

The protection layer 26 has a thickness of 0.5 to 10 nm, for example. The protection layer 26 may be a layered structure made up of a Cu layer having a thickness of 5.0 nm and a Ru layer having a thickness of 5.0 nm.

A method of manufacturing the MR element 5 of the embodiment comprises the steps of forming the underlying layer 21, the antiferromagnetic layer 22, the pinned layer 23, the nonmagnetic conductive layer 24, the free layer 25 and the protection layer 26 one by one on the first shield layer 3 by sputtering, for example.

The operation of the thin-film magnetic head of the embodiment will now be described. The thin-film magnetic head writes data on a recording medium by using the write head and reads data written on the recording medium by using the read head.

In the read head, the direction of the bias magnetic field created by the bias field applying layers 6 intersects the direction orthogonal to the air bearing surface 20 at a right angle. In the MR element 5, the direction of magnetization of the free layer 25 is aligned with the direction of the bias field when no signal magnetic field exists. The direction of magnetization of the pinned layer 23 is fixed to the direction orthogonal to the air bearing surface 20.

In the MR element 5, the direction of magnetization of the free layer 25 changes in response to the signal field sent from the recording medium. The relative angle between the direction of magnetization of the free layer 25 and the direction of magnetization of the pinned layer 23 is thereby changed. As a result, the resistance of the MR element 5 changes. The resistance of the MR element 5 is obtained from the potential difference between the first and second shield layers 3 and 8 when a sense current is fed to the MR element 5 from the shield layers 3 and 8. In such a manner, the data stored on the recording medium is read by the read head.

Features of the MR element 5 of the embodiment will now be described. The MR element 5 of the embodiment comprises: the nonmagnetic conductive layer 24 having two surfaces facing toward opposite directions; the free layer 25 disposed adjacent to one of the surfaces (the top surface) of the nonmagnetic conductive layer 24, wherein the direction of magnetization changes in response to an external magnetic field; and the pinned layer 23 disposed adjacent to the other one of the surfaces (the bottom surface) of the nonmagnetic conductive layer 24, wherein the direction of magnetization is fixed.

The free layer 25 of the embodiment incorporates the first layer 51, the second layer 52, the third layer 53, the fourth layer 54, the fifth layer 55 and the sixth layer 56 that are stacked in this order on the nonmagnetic conductive layer 24. The absolute value of magnetostriction constant of the free layer 25 is $1 \times 10^{-6}$ or smaller. The minimum absolute value of magnetostriction constant of the free layer 25 is zero. The closer to zero the absolute value of magnetostriction constant of the free layer 25, the more preferable it is. The coercivity of the free layer 25 is 20×79.6 A/m or smaller. The minimum value of coercivity of the free layer 25 is zero. The closer to zero the coercivity of the free layer 25, the more preferable it is.

The first layer 51 is placed at a location to touch one of the surfaces (the top surface) of the nonmagnetic conductive layer 24. The first layer 51 is made of an alloy including 'a' atomic percent cobalt and (100−a) atomic percent iron wherein 'a' falls within a range of 20 to 50 inclusive.

The second layer 52 is located on a side of the first layer 51 farther from the nonmagnetic conductive layer 24. The second layer 52 is made of an alloy including 'b' atomic percent cobalt and (100−b) atomic percent iron wherein 'b' falls within a range of 70 to 90 inclusive. Oxidation treatment is given to a surface of the second layer 52 farther from the first layer 51 if required.

The third layer 53 is located on a side of the first layer 51 farther from the second layer 52. The third layer 53 is made of an alloy including nickel and iron. The third layer 53 may be made of an alloy including 'c' atomic percent nickel and (100−c) atomic percent iron wherein 'c' falls within a range of 82 to 85 inclusive. Alternatively, the third layer 53 may be made of an alloy including 'c' atomic percent nickel and (100−c) atomic percent iron wherein 'c' is 82 or 85.

The fourth layer 54, the fifth layer 55 and the sixth layer 56 are located in this order on a side of the third layer 53 farther from the second layer 52. The fourth layer 54 is made of an alloy including 'd' atomic percent cobalt and (100−d) atomic percent iron wherein 'd' falls within a range of 70 to 90 inclusive. The fifth layer 55 is made of an alloy including nickel and iron. The sixth layer 56 is made of an alloy including 'f' atomic percent cobalt and (100−f) atomic percent iron wherein 'f' falls within a range of 70 to 90 inclusive. The fifth layer 55 may be made of an alloy including 'e' atomic percent nickel and (100−e) atomic percent iron wherein 'e' falls within a range of 82 to 85 inclusive. Alternatively, the fifth layer 55 may be made of an alloy including 'e' atomic percent nickel and (100−e) atomic percent iron wherein 'e' is 82 or 85.

In the method of manufacturing the MR element 5 of the embodiment, the step of forming the free layer 25 includes the steps of forming the first layer 51, the second layer 52, the third layer 53, the fourth layer 54, the fifth layer 55 and the sixth layer 56 one by one on the nonmagnetic conductive layer 24 by sputtering, for example. The step of forming the free layer 25 also includes the step of performing oxidation treatment on the surface of the second layer 52 farther from the first layer 51 if required.

The table 1 below shows a specific example of configuration of the MR element 5 of the embodiment. A CoFe alloy including X atomic percent cobalt (Co) and Y atomic percent iron (Fe) will be hereinafter referred to as $Co_XFe_Y$. Similarly, an NiFe alloy including X atomic percent nickel (Ni) and Y atomic percent iron (Fe) will be hereinafter referred to as $Ni_XFe_Y$. In the table 1, 'oxidation' means that oxidation treatment is given to the surface of the second layer 52 farther from the first layer 51.

TABLE 1

| Layer | | Substance | Thickness (nm) |
|---|---|---|---|
| Protection layer | | Ru | 5.0 |
| | | Cu | 5.0 |
| Free layer | | $Co_fFe_{(100-f)}$ f = 70 to 90 | 1.0 |
| | | $Ni_eFe_{(100-e)}$ | 2.0 |
| | | $Co_dFe_{(100-d)}$ d = 70 to 90 | 1.0 |
| | | $Ni_cFe_{(100-c)}$ Oxidation | 2.0 |
| | | $Co_bFe_{(100-b)}$ b = 70 to 90 | 0.5 |
| | | $Co_aFe_{(100-a)}$ a = 20 to 50 | 0.5 |
| Nonmagnetic conductive layer | | Cu | 3.0 |
| Pinned layer | Inner layer | $Co_{30}Fe_{70}$ | 1.5 |
| | | Cu | 0.2 |
| | | $Co_{30}Fe_{70}$ | 1.5 |
| | | Cu | 0.2 |
| | | Co | 1.0 |
| | Nonmagnetic middle layer | Ru | 0.4 |
| | Outer layer | Co | 1.0 |
| | | $Co_{90}Fe_{10}$ | 2.4 |
| | | $Co_{30}Fe_{70}$ | 0.5 |
| | | $Co_{90}Fe_{10}$ | 0.5 |
| Antiferromagnetic layer | | IrMn | 7.0 |
| Underlying layer | | NiFeCr | 5.0 |
| | | Ta | 1.0 |

In the table 1 above, each of the value of 'c' of $Ni_cFe_{(100-c)}$ that constitutes the third layer 53 of the free layer 25 and the value of 'e' of $Ni_eFe_{(100-e)}$ that constitutes the fifth layer 55 of the free layer 25 falls within a range of 82 to 85 inclusive, for example.

Features of the configuration of the free layer 25 of the embodiment will now be described, referring to results of experiments. First, a first experiment will be described. In the first experiment, each of the first layer 51 of the free layer 25 and the layer touching the nonmagnetic conductive layer 24 among the layers making up the inner layer 33 was made of a CoFe alloy, and the relationship was examined between the proportion of Co in the CoFe alloy and the magnetoresistance change amount of the MR element. The CoFe alloy is an alloy that has a high spin polarization. The higher the spin polarization, the greater is the magnetoresistance change amount of the MR element. In the first experiment, a plurality of samples having configurations shown in the table 2 below were fabricated. In these samples, each of the first layer 51 of the free layer 25 and the layer touching the nonmagnetic conductive layer 24 among the layers making up the inner layer 33 was made of $Co_XFe_{(100-X)}$. The proportion X (atomic percent) of Co in the CoFe alloy was different among the samples.

TABLE 2

| Layer | | Substance | Thickness (nm) |
|---|---|---|---|
| Protection layer | | Ru | 5.0 |
| | | Cu | 5.0 |
| Free layer | | $Co_{70}Fe_{30}$ | 1.0 |
| | | $Ni_{82}Fe_{18}$ | 2.0 |
| | | $Co_{70}Fe_{30}$ | 1.0 |
| | | $Ni_{82}Fe_{18}$ | 2.0 |
| | | $Co_{70}Fe_{30}$ | 0.5 |
| | | $Co_XFe_{(100-X)}$ | 0.5 |
| Nonmagnetic conductive layer | | Cu | 3.0 |
| Pinned layer | Inner layer | $Co_XFe_{(100-X)}$ | 1.5 |
| | | Cu | 0.2 |
| | | $Co_{30}Fe_{70}$ | 1.5 |
| | | Cu | 0.2 |
| | | Co | 1.0 |
| | Nonmagnetic middle layer | Ru | 0.4 |
| | Outer layer | Co | 1.0 |
| | | $Co_{90}Fe_{10}$ | 2.4 |
| | | $Co_{30}Fe_{70}$ | 0.5 |
| | | $Co_{90}Fe_{10}$ | 0.5 |
| Antiferromagnetic layer | | IrMn | 7.0 |
| Underlying layer | | NiFeCr | 5.0 |
| | | Ta | 1.0 |

Figure 8:
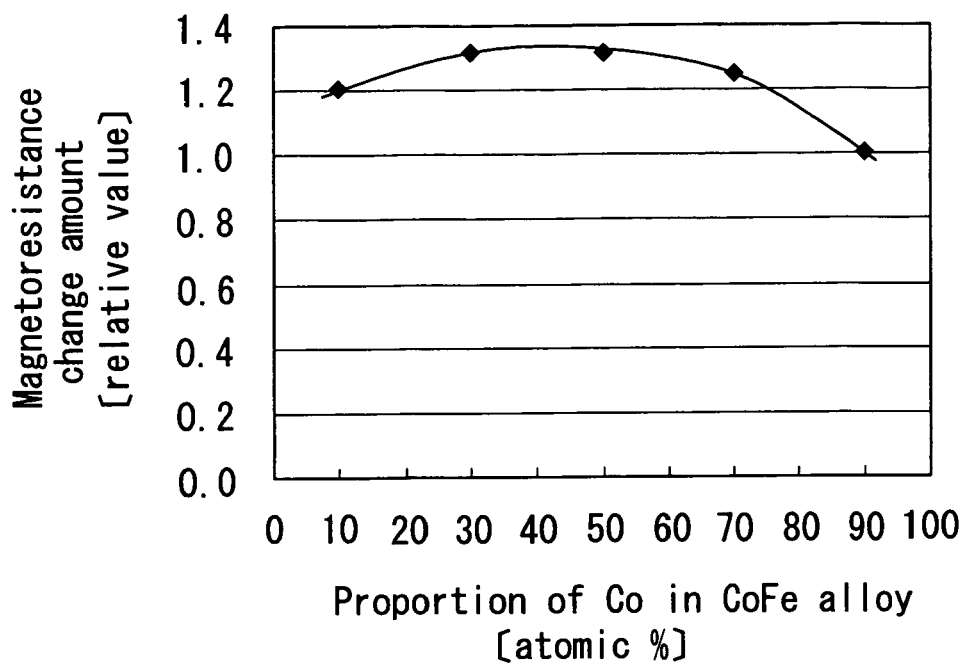
FIG. 8 is a plot showing the result of a first experiment for describing features of the embodiment of the invention.

In the first experiment, the magnetoresistance change amount was measured for each of the plurality of samples having different proportions X (atomic percent) of Co in the CoFe alloys. FIG. 8 shows the result of measurement. FIG. 8 shows the relationship between the magnetoresistance change amount (a relative value) and the proportion X (atomic percent) of Co in the CoFe alloy. Here, the magnetoresistance change amount (a relative value) is one normalized wherein the magnetoresistance change amount of the sample whose X is 90 is defined as 1. FIG. 8 indicates that the value of X falls within a range of 30 to 50 when the magnetoresistance change amount is maximum. It is also noted that the magnetoresistance change amount is sufficiently large when X falls within a range of 30 to 50. This indicates that it is preferred that each of the first layer 51 of the free layer 25 and the layer touching the nonmagnetic conductive layer 24 among the layers making up the inner layer 33 be made of a CoFe alloy in which the proportion of Co is 30 to 50 atomic percent.

It is required for the free layer 25 that not only the magnetoresistance change amount but also the magnetic field sensitivity (the magnetoresistance change/the external magnetic field change) is large. It is therefore required for the free layer 25 that the magnetostriction constant and the coercivity are small. To be specific, it is preferred that the absolute value of magnetostriction constant of the free layer 25 be $1 \times 10^{-6}$ or smaller and that the coercivity of the free layer 25 be 20 Oe (=20×79.6 A/m) or smaller. Therefore, in the embodiment, the permissible range of magnetostriction constant of the free layer 25 is such a range that the absolute value of magnetostriction constant is $1 \times 10^{-6}$ or smaller. In addition, the permissible range of coercivity of the free layer 25 is 0 to 20 Oe (1 Oe=79.6 A/m).

Figure 9:
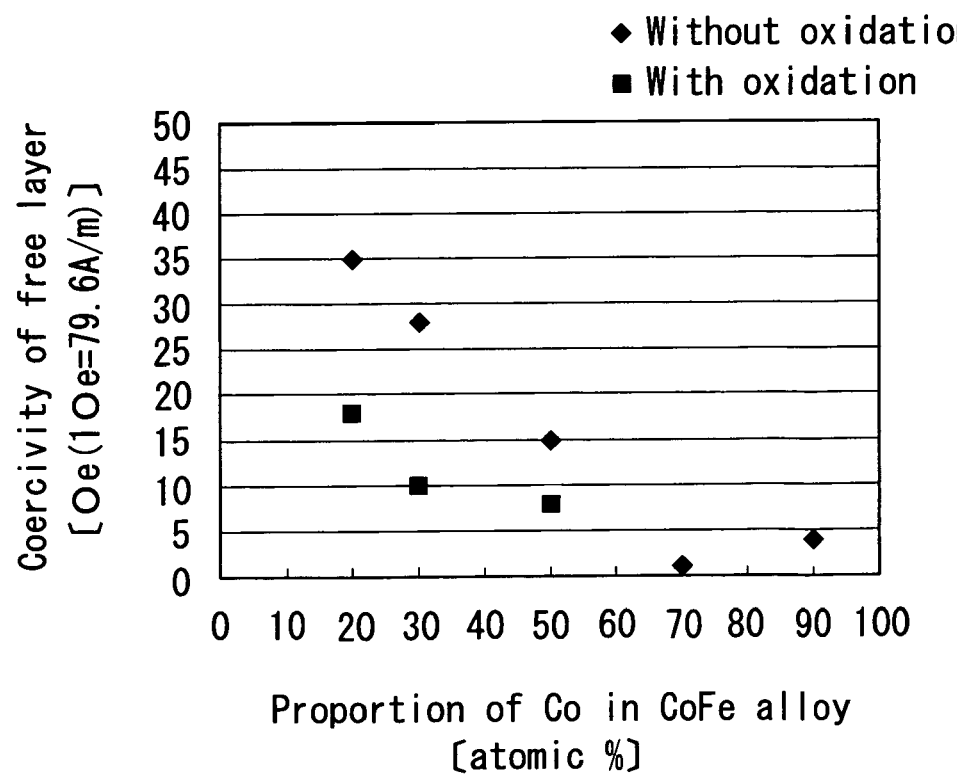
FIG. 9 is a plot showing the result of the first experiment for describing the features of the embodiment of the invention.

In the first experiment, another sample in which oxidation treatment was given to the surface of the second layer 52 of the free layer 25 farther from the first layer 51 was fabricated. The oxidation treatment was performed for 30 seconds in an atmosphere in which the oxygen flow rate was 1 sccm. The coercivity of the free layer 25 was measured for each of the sample that had undergone the oxidation treatment and the sample that had not undergone the oxidation treatment. The result of measurement is shown in FIG. 9. FIG. 9 shows the relationship between the coercivity of the free layer 25 and the proportion X (atomic percent) of Co in the CoFe alloy. In FIG. 9, 'without oxidation' indicates the result of measurement of the above-mentioned sample that had not undergone the oxidation treatment, and 'with oxidation' indicates the result of measurement of the above-mentioned sample that had undergone the oxidation treatment.

Figure 10:
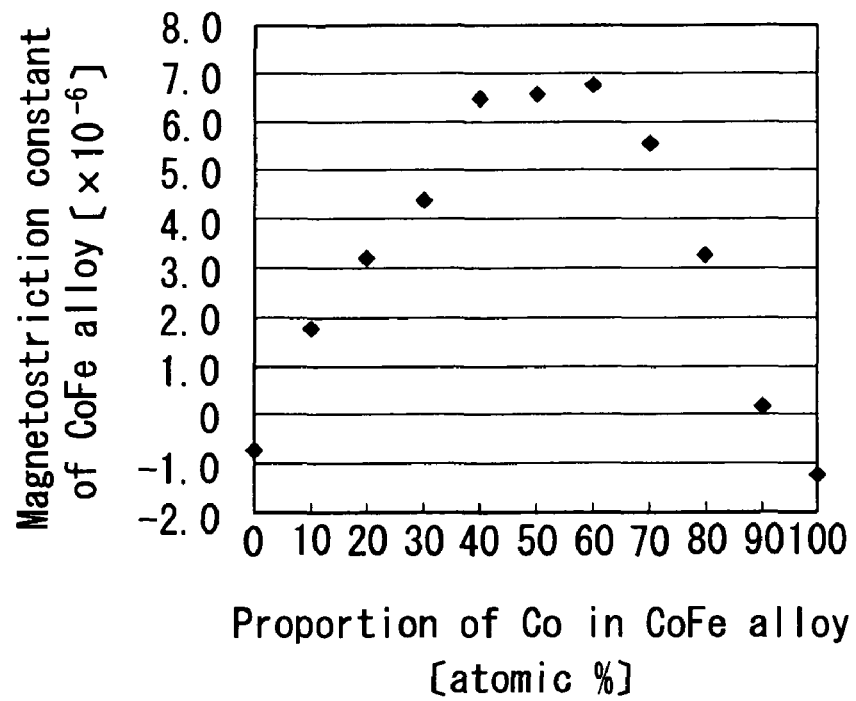
FIG. 10 is a plot showing the relationship between the magnetostriction constant of a CoFe alloy and the proportion of Co in the CoFe alloy used in a free layer of the embodiment of the invention.

FIG. 10 shows the relationship between the proportion X (atomic percent) of Co in the CoFe alloy used for the free layer 25 and the magnetostriction constant of this CoFe alloy.

As FIG. 9 indicates, if the above-mentioned oxidation treatment is not given, the coercivity of the free layer 25 exceeds 20 Oe (=20×79.6 A/m) when the proportion of Co in the CoFe alloy is 30 atomic percent or smaller. However, if the above-mentioned oxidation treatment is given, the coercivity of the free layer 25 is made 20 Oe (=20×79.6 A/m) or smaller when the proportion of Co in the CoFe alloy falls within a range of 20 atomic percent and greater. As FIG. 8 indicates, when the proportion of Co in the CoFe alloy is equal to or greater than 20 atomic percent and smaller than 30 atomic percent, the magnetoresistance change amount is slightly smaller as compared with the case in which the proportion of Co is 30 atomic percent. However, as shown in FIG. 10, when the proportion of Co in the CoFe alloy is equal to or greater than 20 atomic percent and smaller than 30 atomic percent, the magnetostriction constant of the CoFe alloy is greatly reduced as the proportion of Co gets closer to 20 atomic percent. As a result, when the proportion of Co in the CoFe alloy is equal to or greater than 20 atomic percent and smaller than 30 atomic percent, the free layer 25 having excellent soft magnetic characteristics is achieved although the magnetoresistance change amount is slightly reduced. Therefore, the range in which the proportion of Co in the CoFe alloy is equal to or greater than 20 atomic percent and smaller than 30 atomic percent is useful, too.

As described so far, it is preferred that the proportion of Co in the CoFe alloy that constitutes the first layer 51 of the free layer 25 fall within a range of 20 to 50 atomic percent inclusive. Within this range it is possible to increase the magnetoresistance change amount of the MR element and, if oxidation treatment is given to the surface of the second layer 52 farther from the first layer 51 as required, it is possible to make the coercivity of the free layer 25 20 Oe (=20×79.6 A/m) or smaller. As shown in FIG. 10, the absolute value of magnetostriction constant of the CoFe alloy is greater than $1 \times 10^{-6}$ when the proportion of Co in the CoFe alloy falls within a range of 20 to 50 atomic percent inclusive. However, as will be described later, it is possible that the absolute value of magnetostriction constant of the free layer 25 be $1 \times 10^{-6}$ or smaller by controlling the compositions of the layers making up the free layer 25 other than the first layer 51.

The second experiment will now be described, which relates to the conditions for oxidation treatment. As previously described, it is possible to reduce the coercivity of the free layer 25 by giving oxidation treatment to the surface of the second layer 52 farther from the first layer 51. However, it is required that the oxidation treatment will not reduce the magnetization of the CoFe alloy constituting the first layer 51. This is because, a reduction in magnetization of the CoFe alloy has the same effect as a reduction in proportion of Co in the CoFe alloy, and the magnetoresistance change amount of the MR element is thereby reduced. Therefore, in the second experiment, the relationship was examined between the conditions for oxidation treatment and each of the coercivity of the free layer 25 and the magnetization of the free layer 25. In the second experiment, a plurality of samples having configurations shown in the table 3 below were fabricated. The conditions for oxidation treatment given to the surface of the second layer 52 farther from the first layer 51 were different among these samples. To be specific, the oxidation treatment was performed for 30 seconds in an atmosphere in which the oxygen flow rate was different among the samples.

TABLE 3

| Layer | | Substance | Thickness (nm) |
|---|---|---|---|
| Protection layer | | Ru | 5.0 |
| | | Cu | 5.0 |
| Free layer | | Co$_{70}$Fe$_{30}$ | 1.0 |
| | | Ni$_{82}$Fe$_{18}$ | 2.0 |
| | | Co$_{70}$Fe$_{30}$ | 1.0 |
| | | Ni$_{82}$Fe$_{18}$ | 2.0 |
| | | Oxidation | |
| | | Co$_{70}$Fe$_{30}$ | 0.5 |
| | | Co$_{30}$Fe$_{70}$ | 0.5 |
| Nonmagnetic conductive layer | | Cu | 3.0 |
| Pinned layer | Inner layer | Co$_{30}$Fe$_{70}$ | 1.5 |
| | | Cu | 0.2 |
| | | Co$_{30}$Fe$_{70}$ | 1.5 |
| | | Cu | 0.2 |
| | | Co | 1.0 |
| | Nonmagnetic middle layer | Ru | 0.4 |
| | Outer layer | Co | 1.0 |
| | | Co$_{90}$Fe$_{10}$ | 2.4 |
| | | Co$_{30}$Fe$_{70}$ | 0.5 |
| | | Co$_{90}$Fe$_{10}$ | 0.5 |
| Antiferromagnetic layer | | IrMn | 7.0 |
| Underlying layer | | NiFeCr | 5.0 |
| | | Ta | 1.0 |

Figure 11:
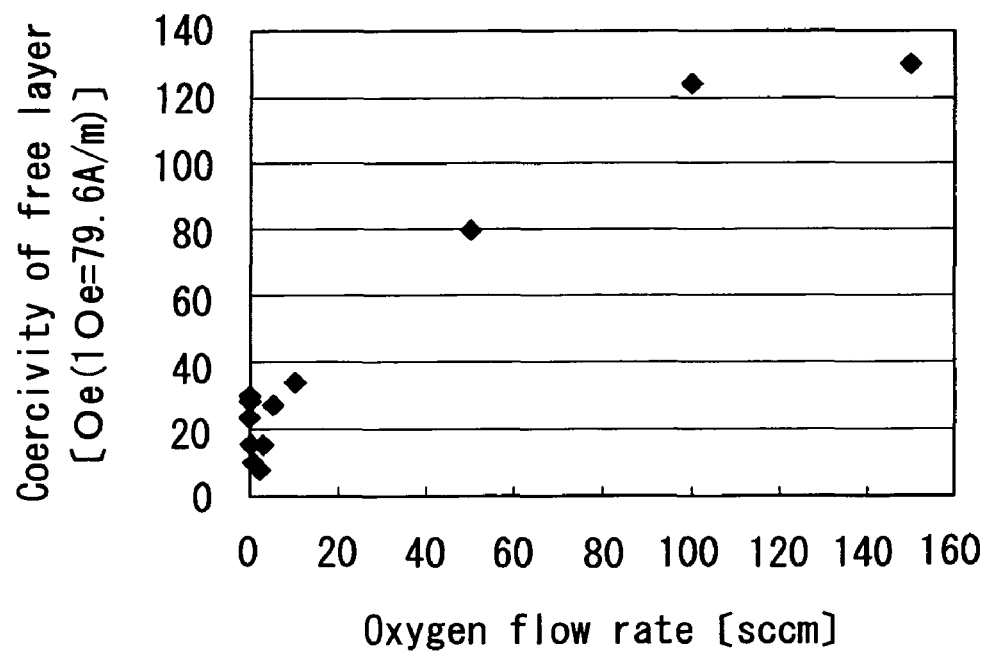
FIG. 11 is a plot showing the result of a second experiment for describing features of the embodiment of the invention.
Figure 12:
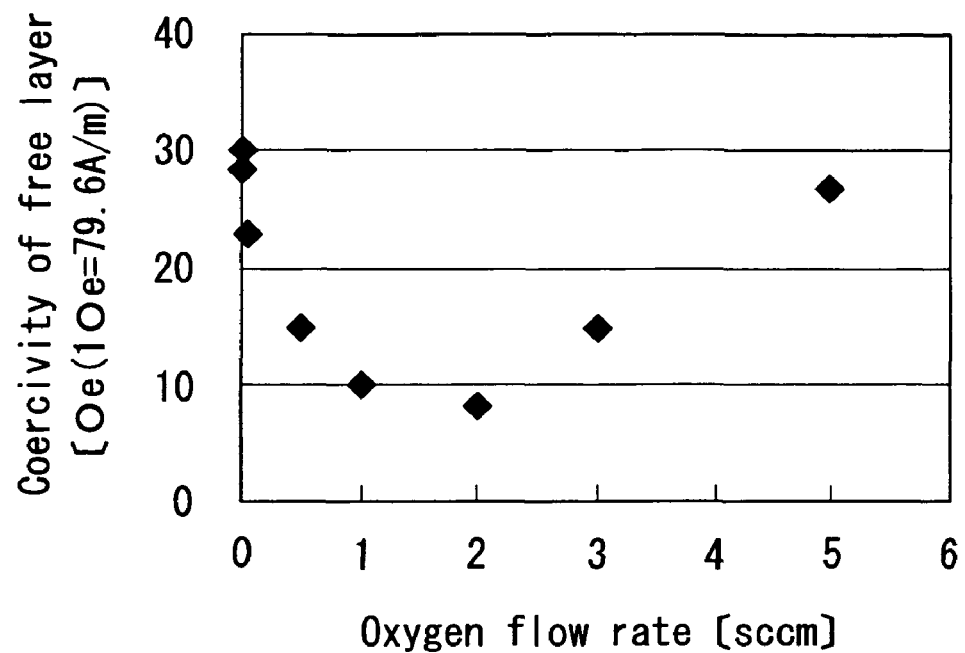
FIG. 12 is a plot showing the result of the second experiment for describing the features of the embodiment of the invention.
Figure 13:
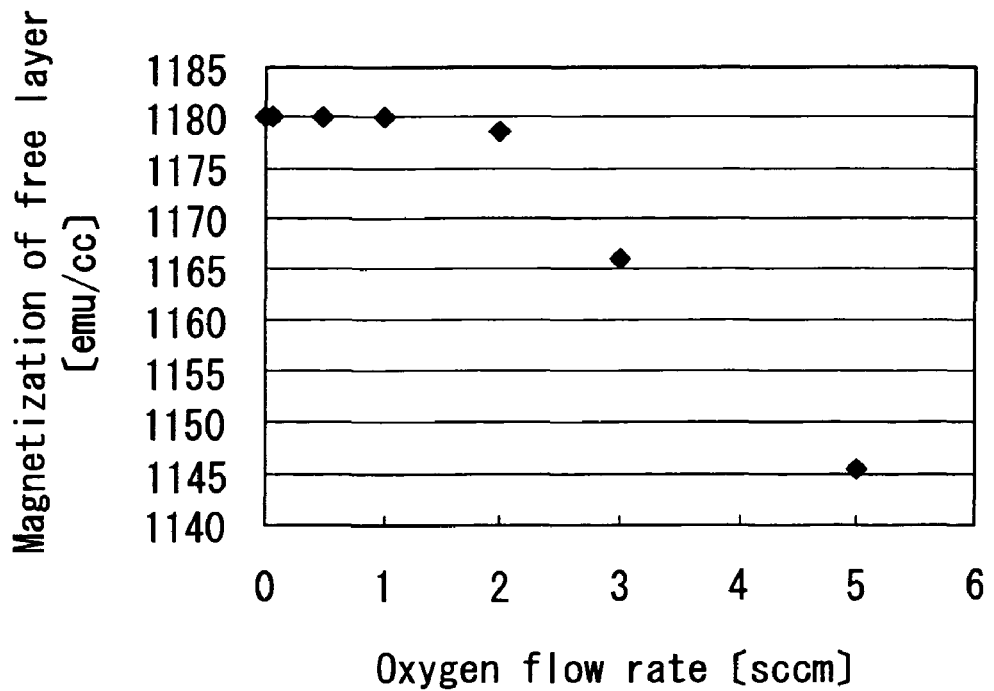
FIG. 13 is a plot showing the result of the second experiment for describing the features of the embodiment of the invention.

FIG. 11 to FIG. 13 show the results of measurement of the second experiment. FIG. 11 indicates the relationship between the oxygen flow rate of the oxidation treatment and the coercivity of the free layer 25. FIG. 12 shows a portion of FIG. 11 enlarged. FIG. 13 indicates the relationship between the oxygen flow rate of the oxidation treatment and the magnetization of the free layer 25. These plots indicate that, as the oxygen flow rate is increased, the coercivity of the free layer 25 is minimum when the oxygen flow rate is 2 sccm, but a reduction in magnetization of the free layer 25 already starts at this point. However, the reduction in magnetization of the free layer 25 is very small when the oxygen flow rate is 2 sccm, compared with the case in which no oxidation treatment has been given (when the oxygen flow rate is 0 sccm). On the other hand, when the oxygen flow rate is 1 sccm, the magnetization of the free layer 25 is not reduced, compared with the case in which no oxidation treatment has been given (when the oxygen flow rate is 0 sccm), and the coercivity of the free layer 25 is approximately 10 Oe (=10×79.6 A/m), which is within a permissible range and is of a small value. Therefore, when the period of oxidation treatment is 30 second, the oxygen flow rate preferably falls within a range of 1 to 2 sccm inclusive, and more preferably about 1 sccm.

If the oxygen flow rate is further made greater than 2 sccm, the coercivity of the free layer 25 increases, and the magnetization of the free layer 25 decreases. Then, the coercivity of the free layer 25 saturates around the point at which the oxygen flow rate is 100 sccm. Although not shown, the magnetization of the free layer 25 when the coercivity of the free layer 25 saturated was decreased down to about one fourth of the magnetization of the free layer 25 obtained when no oxidation treatment had been given. Furthermore, the surface resistance of the free layer 25 when the coercivity of the free layer 25 saturated was increased up to 2.3 times the surface resistance of the free layer 25 obtained when no oxidation treatment had been given. These findings indicate that the oxidation treatment of the embodiment does not completely oxidize the second layer 52 and the first layer 51 but merely slightly oxidizes the surface of the second layer 52 farther form the first layer 51 so as to reduce the coercivity of the free layer 25 without decreasing the magnetization of the free layer 25.

The first and second experiments suggest a configuration shown in the table 4 below as an example of configuration of the MR element wherein the magnetoresistance change amount is large and the coercivity of the free layer 25 is small.

'Oxidation' in the table 4 means oxidation treatment performed on the surface of the second layer 52 farther from the first layer 51 for 30 seconds in an atmosphere in which the oxygen flow rate is 1 sccm.

TABLE 4

| Layer | Substance | Thickness (nm) |
|---|---|---|
| Protection layer | Ru | 5.0 |
| | Cu | 5.0 |
| Free layer | $Co_{70}Fe_{30}$ | 1.0 |
| | $Ni_{82}Fe_{18}$ | 2.0 |
| | $Co_{70}Fe_{30}$ | 1.0 |
| | $Ni_{82}Fe_{18}$ | 2.0 |
| | Oxidation | |
| | $Co_{70}Fe_{30}$ | 0.5 |
| | $Co_xFe_{(100-x)}$ X = 20 to 50 | 0.5 |
| Nonmagnetic conductive layer | Cu | 3.0 |
| Pinned layer Inner layer | $Co_{30}Fe_{70}$ | 1.5 |
| | Cu | 0.2 |

TABLE 4-continued

| Layer | Substance | Thickness (nm) |
|---|---|---|
| | $Co_{30}Fe_{70}$ | 1.5 |
| | Cu | 0.2 |
| | Co | 1.0 |
| Nonmagnetic middle layer | Ru | 0.4 |
| Outer layer | Co | 1.0 |
| | $Co_{90}Fe_{10}$ | 2.4 |
| | $Co_{30}Fe_{70}$ | 0.5 |
| | $Co_{90}Fe_{10}$ | 0.5 |
| Antiferromagnetic layer | IrMn | 7.0 |
| Underlying layer | NiFeCr | 5.0 |
| | Ta | 1.0 |

A third experiment will now be described. In the third experiment, the relationship was obtained between the magnetostriction constant of the free layer 25 and the compositions of the layers of the free layer 25 other than the first layer 51. In the third experiment, first, samples 1 to 7 of the free layers 25 having configurations shown in the table 5 below were fabricated, and the magnetostriction constant and the coercivity of each of the samples were measured. Numerals 1 to 6 of the item 'layer' in the table indicate the first to sixth layers of the free layer 25. 'Oxidation' in the table 5 means that oxidation treatment was performed on the surface of the second layer 52 farther from the first layer 51 for 30 seconds in an atmosphere in which the oxygen flow rate was 1 sccm. Each box of the table 5 in which '←' is placed means that the box indicates the same as the left-hand box does. The table 5 also shows the magnetostriction constant and the coercivity of each of the samples.

TABLE 5

| Layer | Thickness (nm) | Sample 1 | Sample 2 | Sample 3 | Sample 4 | Sample 5 | Sample 6 | Sample 7 |
|---|---|---|---|---|---|---|---|---|
| 6 | 1.0 | $Co_{70}Fe_{30}$ | ← | ← | ← | ← | ← | ← |
| 5 | 2.0 | $Ni_{85}Fe_{15}$ | $Ni_{82}Fe_{18}$ | $Ni_{85}Fe_{15}$ | $Ni_{82}Fe_{18}$ | $Ni_{85}Fe_{15}$ | $Ni_{82}Fe_{18}$ | $Ni_{85}Fe_{15}$ |
| 4 | 1.0 | $Co_{70}Fe_{30}$ | ← | ← | ← | ← | ← | ← |
| 3 | 2.0 | $Ni_{85}Fe_{15}$ | ← | ← | ← | ← | ← | ← |
| | | Oxidation | ← | ← | ← | ← | ← | ← |
| 2 | 0.5 | $Co_{50}Fe_{50}$ | $Co_{70}Fe_{30}$ | $Co_{70}Fe_{30}$ | $Co_{90}Fe_{10}$ | $Co_{90}Fe_{10}$ | Co | Co |
| 1 | 0.5 | $Co_{30}Fe_{70}$ | ← | ← | ← | ← | ← | ← |
| Magnetostriction constant ($\times 10^{-6}$) | | 7.8 | 1.0 | 0.83 | −0.27 | −0.66 | −0.83 | −3.7 |
| Coercivity (Oe) | | 43 | 15 | 10 | 12 | 10 | 35 | 33 |

The conditions for the samples 1 to 7 other than the composition of the second layer 52 and the composition of the fifth layer 55 are the same. The second layer 52 is made up of any of $Co_{50}Fe_{50}$, $Co_{70}Fe_{30}$, $Co_{90}Fe_{10}$, and Co. The fifth layer 55 is made up of $Ni_{85}Fe_{15}$ or $Ni_{82}Fe_{18}$. The magnetostriction constant of $Ni_{82}Fe_{18}$ is nearly zero. The magnetostriction constant of $Ni_{85}Fe_{15}$ is a negative value whose absolute value is large.

The above-listed table 5 indicates that it is possible with the samples 2 to 5 to make each of the magnetostriction constant and the coercivity fall within a permissible range. The table 5 also indicates that, if the composition of the second layer 52 is changed from $Co_{70}Fe_{30}$ to $Co_{90}Fe_{10}$, the magnetostriction constant of the free layer 25 is reduced while the coercivity of the free layer 25 almost remains the same. Although the result of measurement is not shown here, it has been found that when the proportion of Co in the CoFe alloy constituting the second layer 52 falls within a range of 70 to 90 atomic percent, the magnetostriction constant of the free layer 25 is monotonously reduced as the proportion of Co gets closer to 90 atomic percent. The foregoing findings teach that it is possible that each of the magnetostriction constant and the coercivity of the free layer 25 falls within a permissible range as long as the proportion of Co in the CoFe alloy constituting the second layer 52 falls within a range of 70 to 90 atomic percent inclusive.

In the third experiment, furthermore, samples 11 to 17 of the free layers 25 having configurations shown in the table 6 below were fabricated, and the magnetostriction constant and the coercivity of each of the samples were measured. Numerals 1 to 6 of the item 'layer' in the table 6 indicate the first to sixth layers of the free layer 25. 'Oxidation' in the table 6 means that oxidation treatment was performed on the surface of the second layer 52 farther from the first layer 51 for 30 seconds in an atmosphere in which the oxygen flow rate was 1 sccm. Each box of the table 6 in which '←' is placed means that the box indicates the same as the left-hand box does. The table 6 also shows the magnetostriction constant and the coercivity of each of the samples.

range of 70 to 90 atomic percent, the magnetostriction constant of the free layer 25 is monotonously reduced as the proportion of Co gets closer to 90 atomic percent. The foregoing findings teach that it is possible that each of the magnetostriction constant and the coercivity of the free layer 25 falls within a permissible range as long as the proportion of Co in the CoFe alloy constituting each of the second layer 52, the fourth layer 54 and the sixth layer 56 falls within a range of 70 to 90 atomic percent inclusive.

It is well known that the magnetostriction constant of an NiFe alloy changes in accordance with the proportion of Ni in the NiFe alloy. Therefore, it is possible to control the magnetostriction constant of the free layer 25 to be closer to zero by controlling the composition of the NiFe alloy constituting each of the third layer 53 and the fifth layer 55. In particular, the magnetostriction constant of the NiFe alloy is nearly zero when the proportion of Ni in the NiFe alloy is 82 atomic percent, and the magnetostriction constant of the NiFe alloy is a negative value whose absolute value is large when the proportion of Ni in the NiFe alloy is 85 atomic percent. When the proportion of Ni in the NiFe alloy falls within a range of 82 to 85 atomic percent, the magnetostriction constant of the NiFe alloy is monotonously reduced as the proportion of Ni

TABLE 6

| Layer | Thickness (nm) | Substance Sample 11 | Sample 12 | Sample 13 | Sample 14 | Sample 15 | Sample 16 | Sample 17 |
|---|---|---|---|---|---|---|---|---|
| 6 | 1.0 | $Co_{70}Fe_{30}$ | ← | ← | ← | ← | ← | ← |
| 5 | 2.0 | $Ni_{85}Fe_{15}$ | $Ni_{82}Fe_{18}$ | $Ni_{85}Fe_{15}$ | $Ni_{82}Fe_{18}$ | $Ni_{85}Fe_{15}$ | $Ni_{82}Fe_{18}$ | $Ni_{85}Fe_{15}$ |
| 4 | 1.0 | $Co_{90}Fe_{10}$ | ← | ← | ← | ← | ← | ← |
| 3 | 2.0 | $Ni_{85}Fe_{15}$ | ← | ← | ← | ← | ← | ← |
|   |     | Oxidation | ← | ← | ← | ← | ← | ← |
| 2 | 0.5 | $Co_{50}Fe_{50}$ | $Co_{70}Fe_{30}$ | $Co_{70}Fe_{30}$ | $Co_{90}Fe_{10}$ | $Co_{90}Fe_{10}$ | Co | Co |
| 1 | 0.5 | $Co_{30}Fe_{70}$ | ← | ← | ← | ← | ← | ← |
| Magnetostriction constant ($\times 10^{-6}$) |   | 4.4 | 0.77 | 0.63 | −0.66 | −0.89 | −3.1 | −5.2 |
| Coercivity (Oe) |   | 35 | 12 | 10 | 12 | 10 | 25 | 28 |

It is only the composition of the fourth layer 54 that is different between the samples 11 to 17 and the samples 1 to 7. That is, the composition of the fourth layer 54 of the samples 11 to 17 is $Co_{90}Fe_{10}$ while that of the samples 1 to 7 is $Co_{70}Fe_{30}$. The above-listed table 6 indicates that it is possible with the samples 12 to 15 to make each of the magnetostriction constant and the coercivity fall within a permissible range. This result teaches that it is possible that each of the magnetostriction constant and the coercivity of the free layer 25 falls within a permissible range when the composition of the fourth layer 54 is $Co_{90}Fe_{10}$, too, as long as the proportion of Co in the CoFe alloy constituting the second layer 52 falls within a range of 70 to 90 atomic percent inclusive. It is also noted that, if the composition of the fourth layer 54 is changed from $Co_{70}Fe_{30}$ to $Co_{90}Fe_{10}$, the magnetostriction constant of the free layer 25 is reduced while the coercivity of the free layer 25 almost remains the same. Although the result of measurement is not shown here, it has been found that, as is the case with the fourth layer 54, if the composition of the sixth layer 56 is changed from $Co_{70}Fe_{30}$ to $Co_{90}Fe_{10}$, the magnetostriction constant of the free layer 25 is reduced while the coercivity of the free layer 25 almost remains the same. It has also been found that, as is the case with the second layer 52, when the proportion of Co in the CoFe alloy constituting the fourth layer 54 or the sixth layer 56 falls within a gets closer to 85 atomic percent. Therefore, for the NiFe alloy constituting each of the third layer 53 and the fifth layer 55, it is adequate to choose one in which the proportion of Ni falls within a range of 82 to 85 atomic percent inclusive and which can make the magnetostriction constant of the free layer 25 be closer to zero.

The results of the first to third experiments described so far suggest a configuration shown in the table 7 below as a preferred configuration of the free layer 25.

TABLE 7

| Layer | Substance | Thickness (nm) |
|---|---|---|
| 6 | $Co_fFe_{(100-f)}$ f = 70 to 90 | 1.0 |
| 5 | $Ni_eFe_{(100-e)}$ | 2.0 |
| 4 | $Co_dFe_{(100-d)}$ d = 70 to 90 | 1.0 |
| 3 | $Ni_cFe_{(100-c)}$ Oxidation | 2.0 |
| 2 | $Co_bFe_{(100-b)}$ b = 70 to 90 | 0.5 |
| 1 | $Co_aFe_{(100-a)}$ a = 20 to 50 | 0.5 |

'Oxidation' in the table 7 above means that oxidation treatment is performed on the surface of the second layer 52 farther from the first layer 51. This oxidation treatment may be performed for 30 seconds in an atmosphere in which the oxygen flow rate is 1 sccm. Each of the value of 'c' of $Ni_cFe_{(100-c)}$ constituting the third layer 53 and the value of 'e' of $Ni_eFe_{(100-e)}$ constituting the fifth layer 55 is chosen so that the magnetostriction constant of the free layer 25 is closer to zero, depending on the combination with the conditions for the other layers. Each of the values of 'c' and 'd' preferably falls within a range of 82 to 85 inclusive, and more preferably 82 or 85.

A fourth experiment will now be described. In the fourth experiment, an MR element of an example of the embodiment of the invention and reference MR elements 1 to 3 were fabricated, and the magnetostriction constant of the free layer 25, the coercivity of the free layer 25, the diameter of the MR element, the electrical resistance of the MR element, and the magnetoresistance change amount of the MR element were measured for each of the MR elements. The configuration of each of the MR element of the example of the embodiment and the reference MR elements 1 to 3 except the free layer 25 is the same as the one shown in the table 1. The configuration of the free layer 25 of the MR element of the example of the embodiment is shown in the table 8 below. This configuration is included in the preferred configuration of the free layer 25 shown in the above-listed table 7. Numerals 1 to 6 of the item 'layer' in the table 8 indicate the first to sixth layers of the free layer 25. 'Oxidation' in the table 8 means that oxidation treatment was performed on the surface of the second layer 52 farther from the first layer 51 for 30 seconds in an atmosphere in which the oxygen flow rate was 1 sccm.

TABLE 8

| Layer | Substance | Thickness (nm) |
|---|---|---|
| 6 | $Co_{70}Fe_{30}$ | 1.0 |
| 5 | $Ni_{85}Fe_{15}$ | 2.0 |
| 4 | $Co_{70}Fe_{30}$ | 1.0 |
| 3 | $Ni_{85}Fe_{15}$ Oxidation | 2.0 |
| 2 | $Co_{90}Fe_{10}$ | 0.5 |
| 1 | $Co_{30}Fe_{70}$ | 0.5 |

The configurations of the free layers 25 of the reference MR elements 1 to 3 are shown in the tables 9 to 11 below. Numerals in the item 'layer' of each of the tables 9 to 11 indicate the order of layers counted from the lowest one, and do not correspond to the first to sixth layers of the embodiment.

TABLE 9

| Layer | Substance | Thickness (nm) |
|---|---|---|
| 7 | $Co_{70}Fe_{30}$ | 1.0 |
| 6 | $Ni_{82}Fe_{18}$ | 2.0 |
| 5 | $Co_{70}Fe_{30}$ | 0.5 |
| 4 | Cu | 0.2 |
| 3 | $Co_{70}Fe_{30}$ | 0.5 |
| 2 | $Ni_{82}Fe_{18}$ | 2.0 |
| 1 | $Co_{70}Fe_{30}$ | 1.0 |

TABLE 10

| Layer | Substance | Thickness (nm) |
|---|---|---|
| 6 | $Ni_{85}Fe_{15}$ | 2.0 |
| 5 | $Co_{70}Fe_{30}$ | 2.0 |
| 4 | $Ni_{82}Fe_{18}$ | 2.0 |
| 3 | $Co_{70}Fe_{30}$ | 1.0 |
| 2 | Cu | 0.2 |
| 1 | $Co_{70}Fe_{30}$ | 1.0 |

TABLE 11

| Layer | Substance | Thickness (nm) |
|---|---|---|
| 7 | $Co_{70}Fe_{30}$ | 1.0 |
| 6 | $Ni_{82}Fe_{18}$ | 2.0 |
| 5 | $Co_{70}Fe_{30}$ | 0.5 |
| 4 | Cu | 0.2 |
| 3 | $Co_{70}Fe_{30}$ | 0.5 |
| 2 | $Ni_{82}Fe_{18}$ | 2.0 |
| 1 | $Co_{30}Fe_{70}$ | 0.7 |

The free layer 25 of each of the reference MR elements 1 to 3 includes a layered structure made up of a $Co_{70}Fe_{30}$ layer, a Cu layer and a $Co_{70}Fe_{30}$ layer so as to increase the magnetoresistance change amount by means of the effect of scattering of electrons depending on the spin at the interface between the antiferromagnetic layer and the nonmagnetic layer.

The table 12 below shows the magnetostriction constant of the free layer 25, the coercivity of the free layer 25, the diameter of the MR element, the electrical resistance of the MR element, and the magnetoresistance change amount of the MR element for each of the reference MR elements 1 to 3 and the MR element of the example of the embodiment.

TABLE 12

| Sample | Magnetostriction constant ($\times 10^{-6}$) | Coercivity (Oe) | Element diameter (μm) | Electrical resistance (Ω) | Magnetoresistance change amount (Ω) |
|---|---|---|---|---|---|
| Reference 1 | 0.36 | 1.0 | 0.489 | 1.838 | 0.063 |
| Reference 2 | −1.40 | 2.7 | 0.485 | 2.020 | 0.065 |
| Reference 3 | 0.78 | 5.7 | 0.488 | 1.818 | 0.056 |
| Example of embodiment | −0.67 | 10.0 | 0.487 | 2.468 | 0.074 |

As for the MR element of the example of the embodiment, each of the magnetostriction constant and the coercivity falls within a permissible range, and the magnetoresistance change amount is greater than those of the reference MR elements 1 to 3. The magnetoresistance change amount of the MR element of the example of the embodiment increases by 17 percent, compared with the reference MR element 1 whose coercivity and absolute value of magnetostriction constant are smallest among the reference MR elements 1 to 3.

Heating values of the reference MR element 1 and the MR element of the example of the embodiment will now be considered. First, the magnetoresistance change amount of the reference MR element 1 is defined as ΔR (Ω). The output voltage and the sense current of a read head incorporating the reference MR element 1 are defined as ΔV (mV) and I (mA), respectively. The following equation (1) is thus obtained from Ohm's law.

$$\Delta V = \Delta R \times I \quad (1)$$

Next, the output voltage and the sense current of a read head incorporating the MR element of the example of the embodiment are defined as ΔV (mV) and I' (mA), respectively. Since the magnetoresistance change amount of the MR element of the example of the embodiment increases by 17 percent as compared with the reference MR element 1, the magnetoresistance change amount of the MR element of the example is 1.17×ΔR (Ω). The following equation (2) thus holds.

$$\Delta V = 1.17 \times \Delta R \times I' \quad (2)$$

From the equations (1) and (2), I=1.17I' is obtained. If the heating value (Joule heat) of the reference MR element 1 and that of the MR element of the example of the embodiment are defined as J (mW) and J' (mW), respectively, the ratio between these values are expressed by the following equation.

$$J/J' = I\Delta V/I'\Delta V = 1.17$$

This indicates that the heating value of the reference MR element 1 is greater by 17 percent than that of the MR element of the example of the embodiment. In addition, the value of J'/J is 0.85, which means that the heating value of the MR element of the example of the embodiment is reduced by 15 percent, compared with the reference MR element 1. Therefore, it is expected that the life of the MR element of the example of the embodiment is longer than that of the reference MR element 1.

According to the embodiment as described so far, it is possible to implement the MR element 5 having a great magnetoresistance change amount and the free layer 25 with excellent soft magnetic characteristics.

Figure 4:
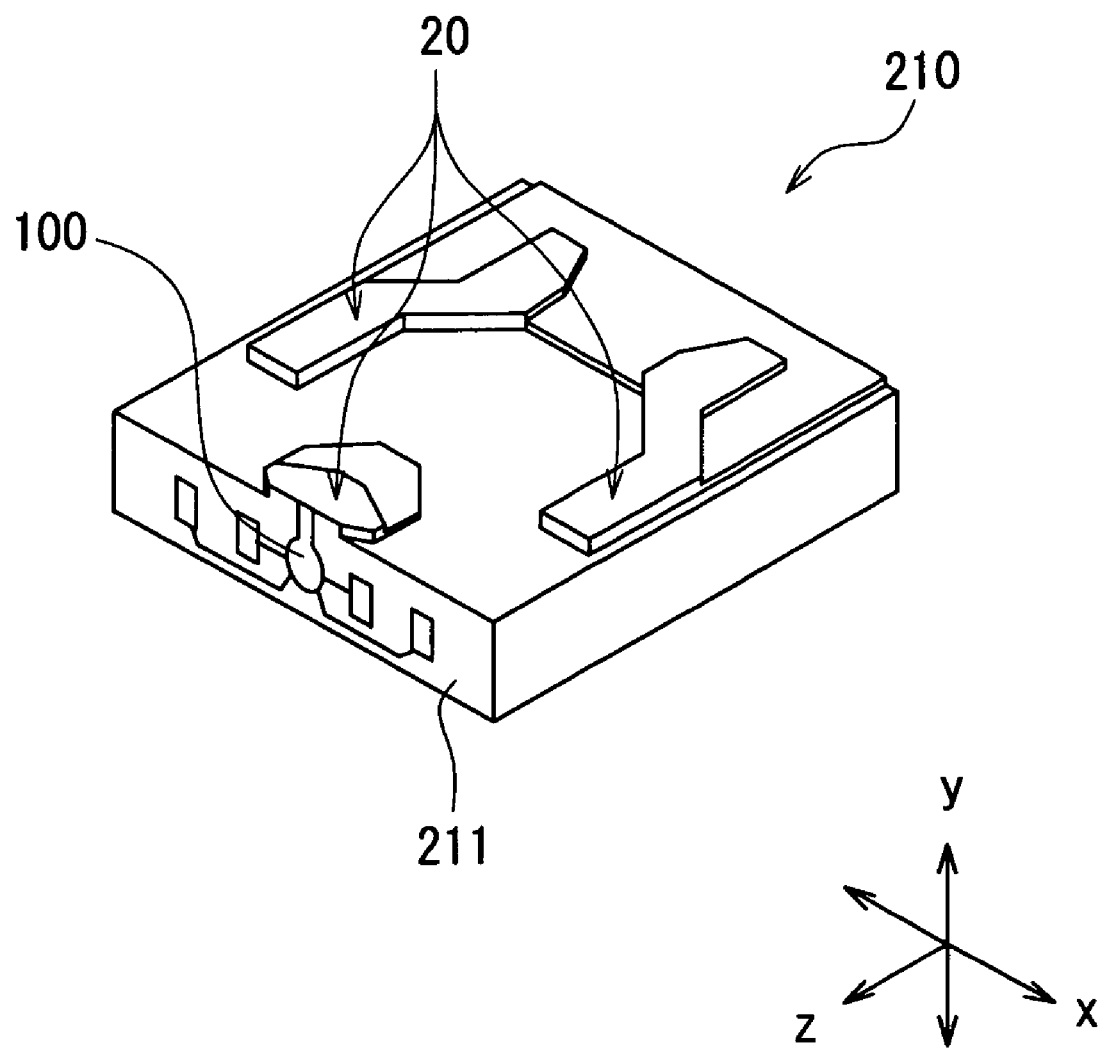
FIG. 4 is a perspective view illustrating a slider incorporated in a head gimbal assembly of the embodiment of the invention.

A head gimbal assembly, a head arm assembly and a magnetic disk drive of the embodiment will now be described. Reference is made to FIG. 4 to describe a slider 210 incorporated in the head gimbal assembly. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 17 of FIG. 2. The base body 211 is nearly hexahedron-shaped. One of the six surfaces of the base body 211 faces toward the magnetic disk platter. The air bearing surface 20 is formed in this one of the surfaces. When the magnetic disk platter rotates in the z direction of FIG. 4, an airflow passes between the magnetic disk platter and the slider 210, and a lift is thereby generated below the slider 210 in the y direction of FIG. 4 and exerted on the slider 210. The slider 210 flies over the magnetic disk platter by means of the lift. The x direction of FIG. 4 is across the tracks of the magnetic disk platter. A thin-film magnetic head 100 of the embodiment is formed near the air-outflow-side end (the end located at the lower left of FIG. 4) of the slider 210.

Figure 5:
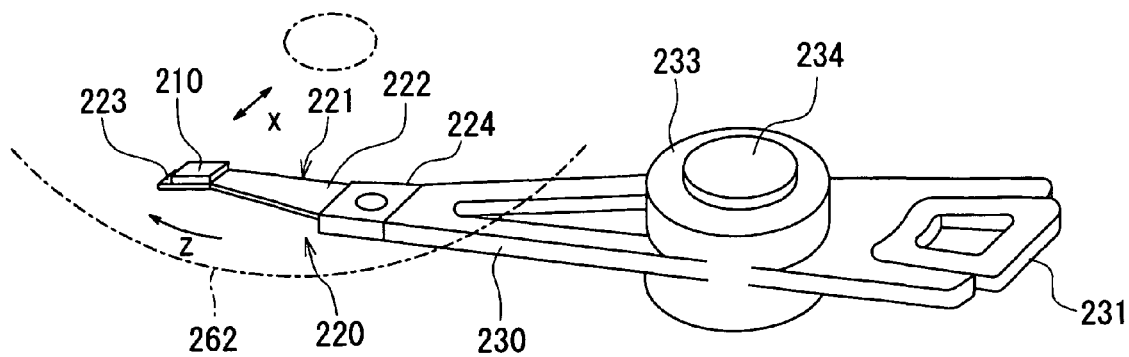
FIG. 5 is a perspective view illustrating a head arm assembly of the embodiment of the invention.

Reference is now made to FIG. 5 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

Figure 6:
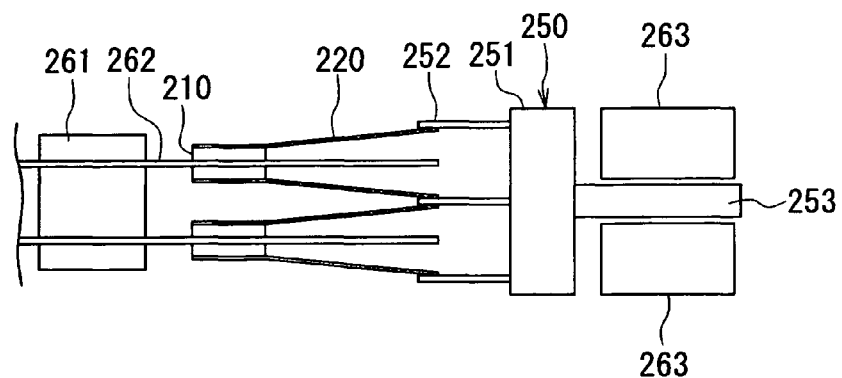
FIG. 6 is a view for illustrating the main part of a magnetic disk drive of the embodiment of the invention.

FIG. 6 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 7:
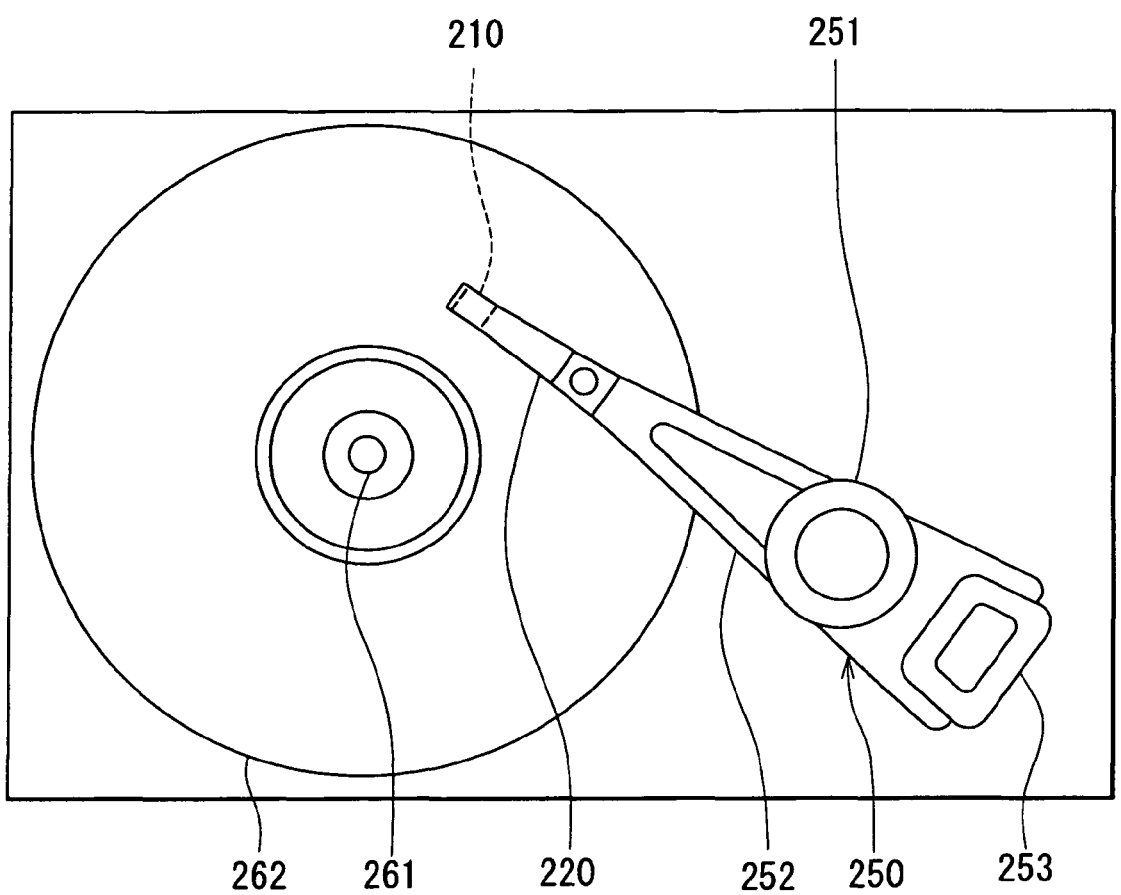
FIG. 7 is a top view of the magnetic disk drive of the embodiment of the invention.

Reference is now made to FIG. 6 and FIG. 7 to describe an example of the head stack assembly and the magnetic disk drive of the embodiment. FIG. 6 illustrates the main part of the magnetic disk drive. FIG. 7 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The thin-film magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the foregoing thin-film magnetic head of the embodiment.

The present invention is not limited to the foregoing embodiment but may be practiced in still other ways. In the invention, for example, the pinned layer 23 is not limited to a synthetic pinned layer.

While the thin-film magnetic head disclosed in the embodiment has such a configuration that the read head is formed on the base body and the write head is stacked on the read head, it is also possible that the read head is stacked on the write head.

If the thin-film magnetic head is dedicated to reading, the thin-film magnetic head may have a configuration comprising a read head only.

The magnetoresistive element of the invention can be used not only for a read head of a thin-film magnetic head but also for other applications such as a magnetic sensor.

Obviously many modifications and variations of the present invention are possible in the light of the above teachings. It is therefore to be understood that within the scope of the appended claims the invention may be practiced otherwise than as specifically described.

What is claimed is:

1. A magnetoresistive element comprising:
a nonmagnetic conductive layer having two surfaces facing toward opposite directions;
a free layer disposed adjacent to one of the surfaces of the nonmagnetic conductive layer, a direction of magnetization in the free layer changing in response to an external magnetic field; and
a pinned layer disposed adjacent to the other of the surfaces of the nonmagnetic conductive layer, a direction of magnetization in the pinned layer being fixed,
a current for detecting magnetic signals being fed in a direction intersecting each of the layers, wherein:
the free layer incorporates a plurality of layers including a first layer, the first layer being placed at a location to touch one of the surfaces of the nonmagnetic conductive layer;
the first layer is made of an alloy containing 'a' atomic percent cobalt and (100−a) atomic percent iron wherein 'a' falls within a range of 20 to 50 inclusive;
the free layer has a magnetostriction constant within a range of $-0.89 \times 10^{-6}$ to $1.0 \times 10^{-6}$; and
the free layer has a coercivity within a range of 10×79.6 A/m to 15×79.6 A/m.

2. The magnetoresistive element according to claim 1, wherein: the free layer incorporates a second layer disposed on a side of the first layer farther from the nonmagnetic conductive layer; the second layer is made of an alloy containing 'b' atomic percent cobalt and (100−b) atomic percent iron wherein 'b' falls within a range of 70 to 90 inclusive, and oxidation treatment is given to a surface of the second layer farther from the first layer.

3. The magnetoresistive element according to claim 2, wherein: the free layer incorporates a third layer disposed on a side of the second layer farther from the first layer; and the third layer is made of an alloy containing nickel and iron.

4. The magnetoresistive element according to claim 3, wherein the third layer is made of an alloy containing 'c' atomic percent nickel and (100−c) atomic percent iron wherein 'c' falls within a range of 82 to 85 inclusive.

5. The magnetoresistive element according to claim 3, wherein the third layer is made of an alloy containing 'c' atomic percent nickel and (100−c) atomic percent iron wherein 'c' is 82 or 85.

6. The magnetoresistive element according to claim 3, wherein:
the free layer incorporates a fourth layer, a fifth layer and a sixth layer that are disposed in this order on a side of the third layer farther from the second layer;
the fourth layer is made of an alloy containing 'd' atomic percent cobalt and (100−d) atomic percent iron wherein 'd' falls within a range of 70 to 90 inclusive;
the fifth layer is made of an alloy containing nickel and iron; and
the sixth layer is made of an alloy containing 'f' atomic percent cobalt and (100−f) atomic percent iron wherein 'f' falls within a range of 70 to 90 inclusive.

7. The magnetoresistive element according to claim 6, wherein the fifth layer is made of an alloy containing 'e' atomic percent nickel and (100−e) atomic percent iron wherein 'e' falls within a range of 82 to 85 inclusive.

8. The magnetoresistive element according to claim 6, wherein the fifth layer is made of an alloy containing 'e' atomic percent nickel and (100−e) atomic percent iron wherein 'e' is 82 or 85.

9. A method of manufacturing a magnetoresistive element comprising:
a nonmagnetic conductive layer having two surfaces facing toward opposite directions;
a free layer disposed adjacent to one of the surfaces of the nonmagnetic conductive layer, a direction of magnetization in the free layer changing in response to an external magnetic field; and
a pinned layer disposed adjacent to the other of the surfaces of the nonmagnetic conductive layer, a direction of magnetization in the pinned layer being fixed,
a current for detecting magnetic signals being fed in a direction intersecting each of the layers,
the method comprising the steps of forming the pinned layer, the nonmagnetic conductive layer and the free layer, respectively, wherein:
a plurality of layers including a first layer are formed in the step of forming the free layer, the first layer being placed at a location to touch one of the surfaces of the nonmagnetic layer;
the first layer is made of an alloy containing 'a' atomic percent cobalt and (100−a) atomic percent iron wherein 'a' falls within a range of 20 to 50 inclusive;
the free layer is made to have a magnetostriction constant within a range of $-0.89 \times 10^{-6}$ to $1.0 \times 10^{-6}$; and
the free layer is made to have a coercivity within a range of 10×79.6 A/m to 15×79.6 A/m.

10. A magnetoresistive device comprising a magnetoresistive element and a pair of electrodes for feeding a current for detecting magnetic signals to the magnetoresistive element in a direction intersecting each layer making up the magnetoresistive element, the magnetoresistive element comprising:
a nonmagnetic conductive layer having two surfaces facing toward opposite directions;
a free layer disposed adjacent to one of the surfaces of the nonmagnetic conductive layer, a direction of magnetization in the free layer changing in response to an external magnetic field; and
a pinned layer disposed adjacent to the other of the surfaces of the nonmagnetic conductive layer, a direction of magnetization in the pinned layer being fixed, wherein:

in the magnetoresistive element, the current for detecting magnetic signals is fed in the direction intersecting each of the layers;

the free layer incorporates a plurality of layers including a first layer, the first layer being placed at a location to touch one of the surfaces of the nonmagnetic conductive layer;

the first layer is made of an alloy containing 'a' atomic percent cobalt and (100−a) atomic percent iron wherein 'a' falls within a range of 20 to 50 inclusive;

the free layer has a magnetostriction constant within a range of $-0.89\times10^{-6}$ to $1.0\times10^{-6}$; and the free layer has a coercivity of within a range of $10\times79.6$ A/m to $15\times79.6$ A/m.

11. A thin-film magnetic head comprising: a medium facing surface that faces toward a recording medium; a magnetoresistive element disposed near the medium facing surface to detect a signal magnetic field sent from the recording medium; and a pair of electrodes for feeding a current for detecting magnetic signals to the magnetoresistive element in a direction intersecting each layer making up the magnetoresistive element, the magnetoresistive element comprising:

a nonmagnetic conductive layer having two surfaces facing toward opposite directions;

a free layer disposed adjacent to one of the surfaces of the nonmagnetic conductive layer, a direction of magnetization in the free layer changing in response to an external magnetic field; and a pinned layer disposed adjacent to the other of the surfaces of the nonmagnetic conductive layer, a direction of magnetization in the pinned layer being fixed, wherein:

in the magnetoresistive element, the current for detecting magnetic signals is fed in the direction intersecting each of the layers;

the free layer incorporates a plurality of layers including a first layer, the first layer being placed at a location to touch one of the surfaces of the nonmagnetic conductive layer;

the first layer is made of an alloy containing 'a' atomic percent cobalt and (100−a) atomic percent iron wherein 'a' falls within a range of 20 to 50 inclusive;

the free layer has a magnetostriction constant within a range of $-0.89\times10^{-6}$ to $1.0\times10^{-6}$; and the free layer has a coercivity within a range of $10\times79.6$ A/m to $15\times79.6$ A/m.

12. A head gimbal assembly comprising: a slider including a thin-film magnetic head and disposed to face toward a recording medium; and a suspension flexibly supporting the slider, wherein:

the thin-film magnetic head comprises: a medium facing surface that faces toward the recording medium; a magnetoresistive element disposed near the medium facing surface to detect a signal magnetic field sent from the recording medium; and a pair of electrodes for feeding a current for detecting magnetic signals to the magnetoresistive element in a direction intersecting each layer making up the magnetoresistive element, the magnetoresistive element comprising:

a nonmagnetic conductive layer having two surfaces facing toward opposite directions;

a free layer disposed adjacent to one of the surfaces of the nonmagnetic conductive layer, a direction of magnetization in the free layer changing in response to an external magnetic field; and a pinned layer disposed adjacent to the other of the surfaces of the nonmagnetic conductive layer, a direction of magnetization in the pinned layer being fixed, wherein:

in the magnetoresistive element, the current for detecting magnetic signals is fed in the direction intersecting each of the layers;

the free layer incorporates a plurality of layers including a first layer, the first layer being placed at a location to touch one of the surfaces of the nonmagnetic conductive layer;

the first layer is made of an alloy containing 'a' atomic percent cobalt and (100−a) atomic percent iron wherein 'a' falls within a range of 20 to 50 inclusive;

the free layer has a magnetostriction constant within a range of $-0.89\times10^{-6}$ to $1.0\times10^{-6}$; and the free layer has a coercivity within a range of $10\times79.6$ A/m to $15\times79.6$ A/m.

13. A head arm assembly comprising: a slider including a thin-film magnetic head and disposed to face toward a recording medium; a suspension flexibly supporting the slider; and an arm for making the slider travel across tracks of the recording medium, the suspension being attached to the arm, wherein:

the thin-film magnetic head comprises: a medium facing surface that faces toward the recording medium; a magnetoresistive element disposed near the medium facing surface to detect a signal magnetic field sent from the recording medium; and a pair of electrodes for feeding a current for detecting magnetic signals to the magnetoresistive element in a direction intersecting each layer making up the magnetoresistive element, the magnetoresistive element comprising:

a nonmagnetic conductive layer having two surfaces facing toward opposite directions;

a free layer disposed adjacent to one of the surfaces of the nonmagnetic conductive layer, a direction of magnetization in the free layer changing in response to an external magnetic field; and a pinned layer disposed adjacent to the other of the surfaces of the nonmagnetic conductive layer, a direction of magnetization in the pinned layer being fixed, wherein:

in the magnetoresistive element, the current for detecting magnetic signals is fed in the direction intersecting each of the layers;

the free layer incorporates a plurality of layers including a first layer, the first layer being placed at a location to touch one of the surfaces of the nonmagnetic conductive layer;

the first layer is made of an alloy containing 'a' atomic percent cobalt and (100−a) atomic percent iron wherein 'a' falls within a range of 20 to 50 inclusive;

the free layer has a magnetostriction constant within a range of $-0.89\times10^{-6}$ to $1.0\times10^{-6}$; and the free layer has a coercivity within a range of $10\times79.6$ A/m to $15\times79.6$ A/m.

14. A magnetic disk drive comprising: a slider including a thin-film magnetic head and disposed to face toward a circular-plate-shaped recording medium that is driven to rotate; and an alignment device supporting the slider and aligning the slider with respect to the recording medium, wherein:

the thin-film magnetic head comprises: a medium facing surface that faces toward the recording medium; a magnetoresistive element disposed near the medium facing surface to detect a signal magnetic field sent from the recording medium; and a pair of electrodes for feeding a current for detecting magnetic signals to the magnetoresistive element in a direction intersecting each layer making up the magnetoresistive element, the magnetoresistive element comprising:

a nonmagnetic conductive layer having two surfaces facing toward opposite directions;

a free layer disposed adjacent to one of the surfaces of the nonmagnetic conductive layer, a direction of magnetization in the free layer changing in response to an external magnetic field; and a pinned layer disposed adjacent to the other of the surfaces of the nonmagnetic conductive layer, a direction of magnetization in the pinned layer being fixed, wherein:

in the magnetoresistive element, the current for detecting magnetic signals is fed in the direction intersecting each of the layers;

the free layer incorporates a plurality of layers including a first layer, the first layer being placed at a location to touch one of the surfaces of the nonmagnetic conductive layer;

the first layer is made of an alloy containing 'a' atomic percent cobalt and (100−a) atomic percent iron wherein 'a' falls within a range of 20 to 50 inclusive;

the free layer has a magnetostriction constant within a range of $-0.89 \times 10^{-6}$ to $1.0 \times 10^{-6}$; and the free layer has a coercivity within a range of $10 \times 79.6$ A/m to $15 \times 79.6$ A/m.

* * * * *

UNITED STATES PATENT AND TRADEMARK OFFICE
CERTIFICATE OF CORRECTION

PATENT NO. : 7,787,220 B2
APPLICATION NO. : 11/391278
DATED : August 31, 2010
INVENTOR(S) : Tomohito Mizuno et al.

It is certified that error appears in the above-identified patent and that said Letters Patent is hereby corrected as shown below:

Title Page
Please amend the title as follows:
(54) MAGNETORESISTIVE ELEMENT WITH IMPROVED MAGNETORESISTANCE CHANGE AMOUNT AND WITH FREE LAYER HAVING IMPROVED SOFT MAGNETIC CHARACTERISTICS Please amend the title at column 1, line 1 as follows:
MAGNETORESISTIVE ELEMENT WITH IMPROVED MAGNETORESISTANCE CHANGE AMOUNT AND WITH FREE LAYER HAVING IMPROVED SOFT MAGNETIC CHARACTERISTICS Please replace the paragraph beginning at column 21, line 10, with the following rewritten paragraph:
Heating values of the reference MR element 1 and the MR element of the example of the embodiment will now be considered. First, the magnetoresistance change amount of the reference MR element 1 is defined as $\Delta R(\Omega)$. The output voltage and the sense current of a read head incorporating the reference MR element 1 are defined as $\Delta V$ (mV) and I (mA), respectively. The following equation (1) is thus obtained from Ohm's law.

$$\Delta V = \Delta R \times I$$

Please replace the paragraph beginning at column 22, line 29, with the following rewritten paragraph:
FIG. 5 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Please amend claim 10 at column 24, line 54, with the following rewritten claim:
10. A magnetoresistive device comprising a magnetoresistive element and a pair of electrodes for feeding a current for detecting magnetic signals to the magnetoresistive element in a direction Signed and Sealed this
Thirtieth Day of August, 2011

David J. Kappos
*Director of the United States Patent and Trademark Office* intersecting each layer making up the magnetoresistive element, the magnetoresistive element comprising:

a nonmagnetic conductive layer having two surfaces facing toward opposite directions;

a free layer disposed adjacent to one of the surfaces of the nonmagnetic conductive layer, a direction of magnetization in the free layer changing in response to an external magnetic field; and a pinned layer disposed adjacent to the other of the surfaces of the nonmagnetic conductive layer, a direction of magnetization in the pinned layer being fixed, wherein:

in the magnetoresistive element, the current for detecting magnetic signals is fed in the direction intersecting each of the layers;

the free layer incorporates a plurality of layers including a first layer, the first layer being placed at a location to touch one of the surfaces of the nonmagnetic conductive layer;

the first layer is made of an alloy containing 'a' atomic percent cobalt and (100-a) atomic percent iron wherein 'a' falls within a range of 20 to 50 inclusive;

the free layer has a magnetostriction constant within a range of $-0.89 \times 10^{-6}$ to $1.0 \times 10^{-6}$; and the free layer has a coercivity within a range of $10 \times 79.6$ A/m to $15 \times 79.6$ A/m.